(12) United States Patent
Green

(10) Patent No.: US 7,299,836 B2
(45) Date of Patent: Nov. 27, 2007

(54) STUMP CUTTING TOOTH AND POCKET

(76) Inventor: Kevin J. Green, 9650 Packard Rd., Morenci, MI (US) 49256

( * ) Notice: Subject to any disclaimer, the term of this patent is extended or adjusted under 35 U.S.C. 154(b) by 0 days.

(21) Appl. No.: 10/413,560

(22) Filed: Apr. 14, 2003

(65) Prior Publication Data

US 2003/0188802 A1 Oct. 9, 2003

Related U.S. Application Data

(63) Continuation-in-part of application No. 09/909,766, filed on Jul. 19, 2001, now abandoned.

(60) Provisional application No. 60/219,299, filed on Jul. 19, 2000.

(51) Int. Cl.
*A01G 23/06* (2006.01)

(52) U.S. Cl. .................. 144/24.12; 144/176; 144/235; 144/241

(58) Field of Classification Search ............. 144/24.12, 144/172, 174, 176, 218, 221, 230, 233, 235, 144/241, 34; 407/33, 34, 46, 101, 40, 42, 407/48, 47, 53; 299/79.1, 102, 103; 241/293, 241/294; 30/347; 56/255, 295
See application file for complete search history.

(56) References Cited

U.S. PATENT DOCUMENTS

| | | | |
|---|---|---|---|
| 1,646,813 A | 10/1927 | Davey et al. | |
| 2,996,291 A * | 8/1961 | Krekeler | 299/109 |
| 3,256,043 A * | 6/1966 | Krekeler | 299/108 |
| 3,570,566 A | 3/1971 | McCreery | |
| 3,797,544 A | 3/1974 | Ver Ploeg | |
| 3,844,619 A * | 10/1974 | Haller | 299/108 |
| 3,935,887 A | 2/1976 | Van Zante et al. | |
| 4,343,516 A | 8/1982 | Aden | |
| 4,506,715 A | 3/1985 | Blackwell | |
| 4,536,037 A | 8/1985 | Rink | |
| 4,738,291 A | 4/1988 | Isley | |
| 4,744,278 A | 5/1988 | Wright | |
| 4,750,396 A | 6/1988 | Gaddis et al. | |
| 4,759,394 A | 7/1988 | Clemenson | |
| 4,812,087 A | 3/1989 | Stashko | |
| 4,827,995 A | 5/1989 | Wilson | |
| 4,932,447 A | 6/1990 | Morin | |
| 4,974,649 A | 12/1990 | Manning | |
| 4,998,574 A | 3/1991 | Beach et al. | |
| 5,005,622 A * | 4/1991 | Beach et al. | 144/241 |
| 5,042,733 A | 8/1991 | Hench | |
| 5,063,731 A | 11/1991 | Hull et al. | |
| 5,131,305 A | 7/1992 | MacLennan | |
| 5,135,035 A * | 8/1992 | Mills | 144/241 |
| 5,201,352 A | 4/1993 | Hult | |
| 5,203,388 A | 4/1993 | Bowling | |
| 5,211,212 A | 5/1993 | Carlson et al. | |
| 5,248,188 A | 9/1993 | Walgren | |

(Continued)

*Primary Examiner*—Shelley M. Self
(74) *Attorney, Agent, or Firm*—Burgess Law Office, PLLC

(57) ABSTRACT

A stump cutting tool for use with a stump cutting apparatus having a rotatable cutting wheel or drum having at least one cutting tool mounted to the wheel or drum. The cutting tool includes a tool holder or pocket used to secure a separate cutting tooth. The pocket or tool holder includes the least one bore extending therethrough for use in securing the cutting tool to the cutting wheel or drum.

16 Claims, 23 Drawing Sheets

U.S. PATENT DOCUMENTS

| | | |
|---|---|---|
| 5,261,306 A | 11/1993 | Morey et al. |
| 5,269,355 A | 12/1993 | Bowen |
| 5,279,345 A | 1/1994 | LeMaux et al. |
| 5,289,859 A | 3/1994 | Minton, Jr. et al. |
| 5,318,351 A | 6/1994 | Walker |
| 5,363,891 A | 11/1994 | Plante |
| 5,365,986 A | 11/1994 | Hooser |
| 5,497,815 A | 3/1996 | Bowling |
| 5,623,979 A | 4/1997 | Bowling |
| 5,743,314 A | 4/1998 | Puch |
| 5,819,827 A | 10/1998 | Leonardi |
| 6,024,143 A | 2/2000 | Ritchey |
| 6,382,277 B1 * | 5/2002 | Paumier et al. .............. 144/235 |

* cited by examiner

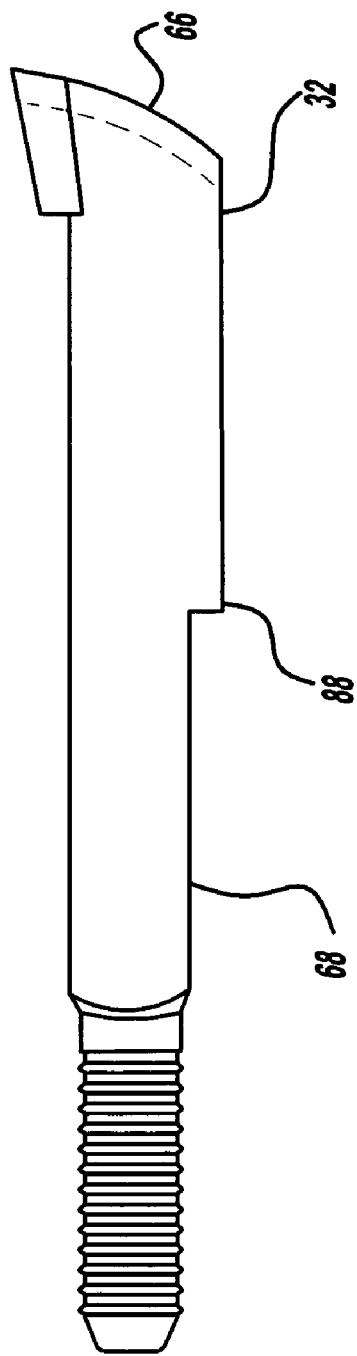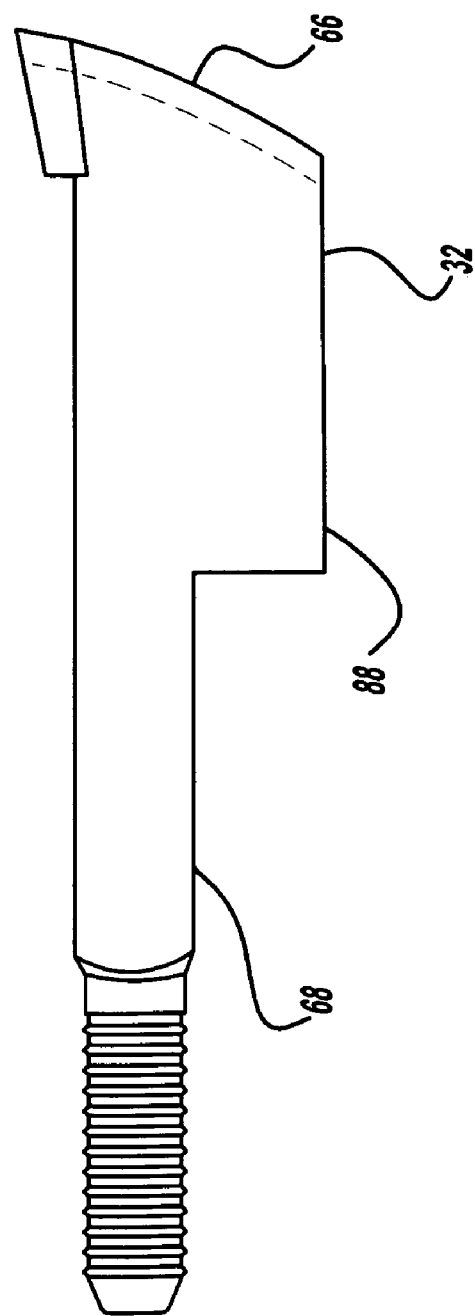

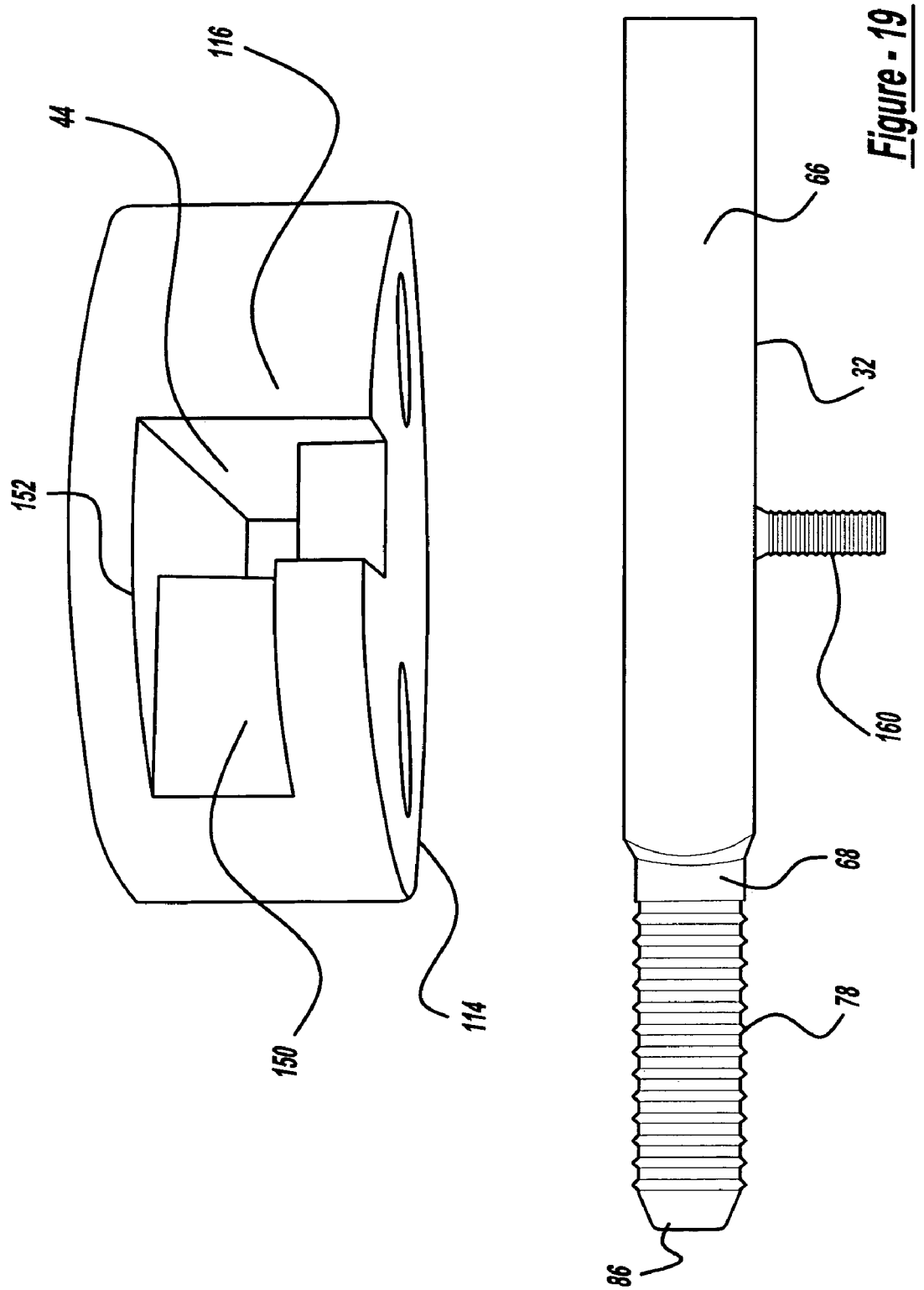

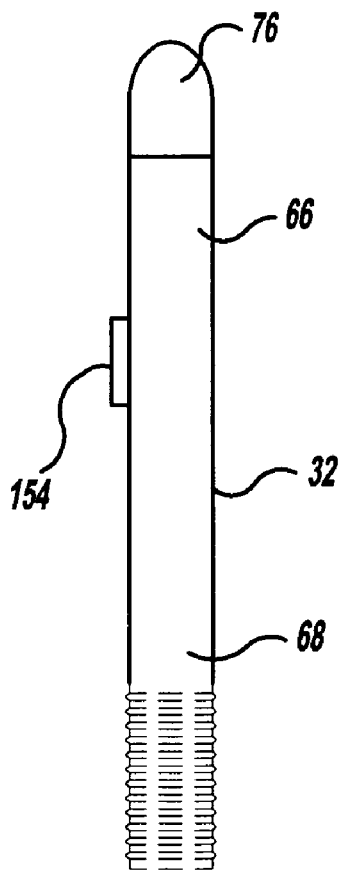
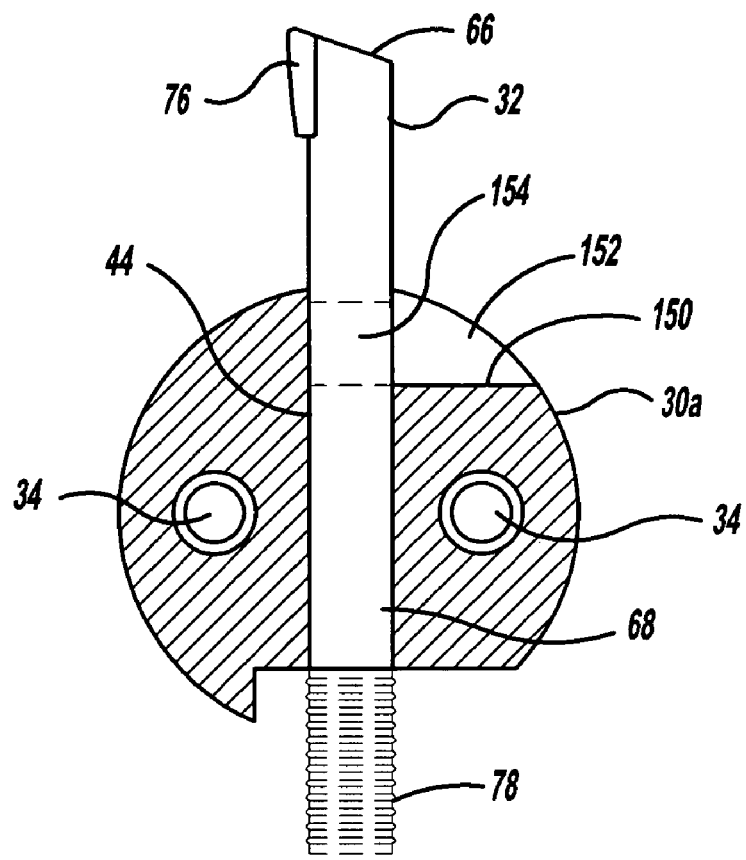
*Figure - 20*
*Figure - 21*

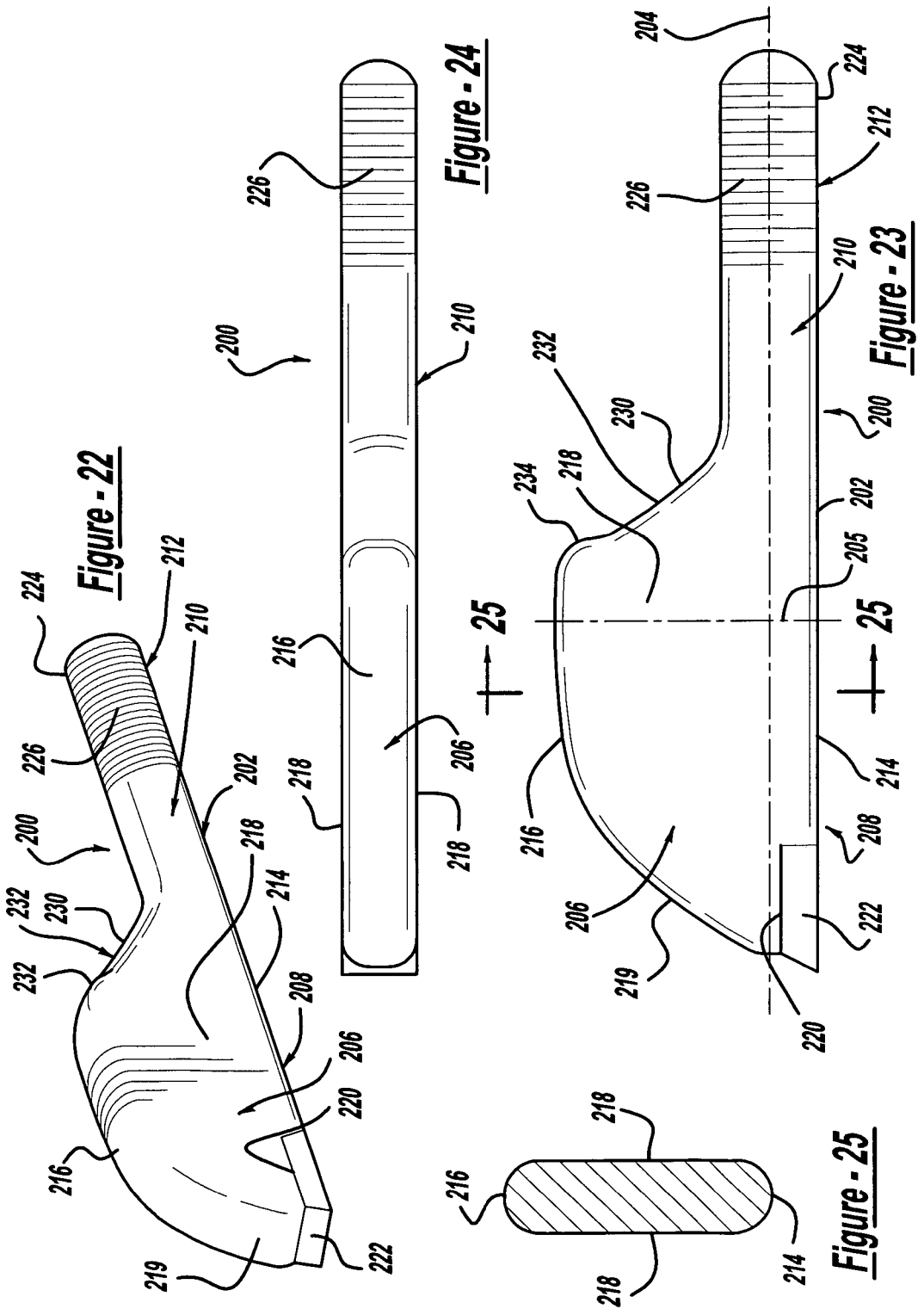

US 7,299,836 B2

STUMP CUTTING TOOTH AND POCKET

This application is a Continuation In Part of, is based on and claims priority on U.S. patent application Ser. No. 09/909,776 filed on Jul. 19, 2001, now abandoned, which claims priority on U.S. Provisional patent application Ser. No. 60/219,299 filed Jul. 19, 2000.

BACKGROUND OF THE INVENTION

1. Field of the Invention

The present invention relates generally to a stump cutting apparatus and, more specifically, to a stump cutting tool for use with a stump cutting apparatus.

2. Description of the Related Art

Various types of stump cutting devices are known. One type includes a rotatable disk having a plurality of cutting tools fastened to the peripheral edge thereof. A second type includes a rotatable drum having a plurality of cutting tools fastened to an outer circumferential surface thereof. During operation, the disk or drum rotates such that the cutting tools engage and cut the stump. Various types of cutting tools are used with either stump cutting apparatus. The cutting tool typically includes a tool holder or pocket secured to the cutting wheel or drum and a cutting tooth secured by the pocket to the cutting wheel. Such a cutting tool is referred to as a two-piece cutting tool because the pocket and cutting tooth are two separate pieces. In addition, a one-piece cutting tool, wherein the entire cutting tool assembly is complete in one piece and fastened to the wheel as a single unit is known. Two-piece cutting tools have an advantage in that the cutting tooth can be removed and replaced without removing the pocket or tool holder from the cutting wheel or drum.

SUMMARY OF THE INVENTION

Accordingly, the present invention provides a stump cutting tool including a tool holder or pocket used to secure a separate cutting tooth to a cutting wheel or drum of a stump cutter apparatus. The stump cutting tool includes a pocket or tool holder including at least one bore extending therethrough for use in securing the pocket to the cutting wheel or drum. The pocket further includes a bore in the pocket. The cutting tool is disposed and secured within the bore. The cutting tool includes a carbide or hard cutting tip attached to one end of the cutting tooth. The present invention may also include a cutting tool locating stop Used to properly locate or position the cutting tip with respect to the pocket or tool holder. Other features and advantages of the present invention will be readily appreciated, as the same becomes better understood after reading the subsequent description taken in conjunction with the accompanying drawings.

BRIEF DESCRIPTION OF THE DRAWINGS

FIGS. 18 and 18a are side views of a cutting tooth for use with the cutting tool assembly of FIG. 12;

FIG. 19 is a top view of a pocket and exemplary cutting tooth having a stop member according to the present invention;

FIG. 20 is a cross-sectional view of a pocket and cutting tooth forming a cutting tool according to the present invention having a stop attached to the cutting tooth;

FIG. 21 is a front view of the cutting tooth of FIG. 20;

FIG. 22 is a perspective view of the a cutting tooth of yet a further embodiment of the present invention;

FIG. 23 is a side view of the cutting tooth of FIG. 22;

FIG. 24 is a rear view of the cutting tooth of FIG. 22;

FIG. 25 is a cross-sectional view of the cutting tooth of FIG. 23 taken along the lines 25-25;

DETAILED DESCRIPTION OF THE PREFERRED EMBODIMENT(S)

Figure 1:
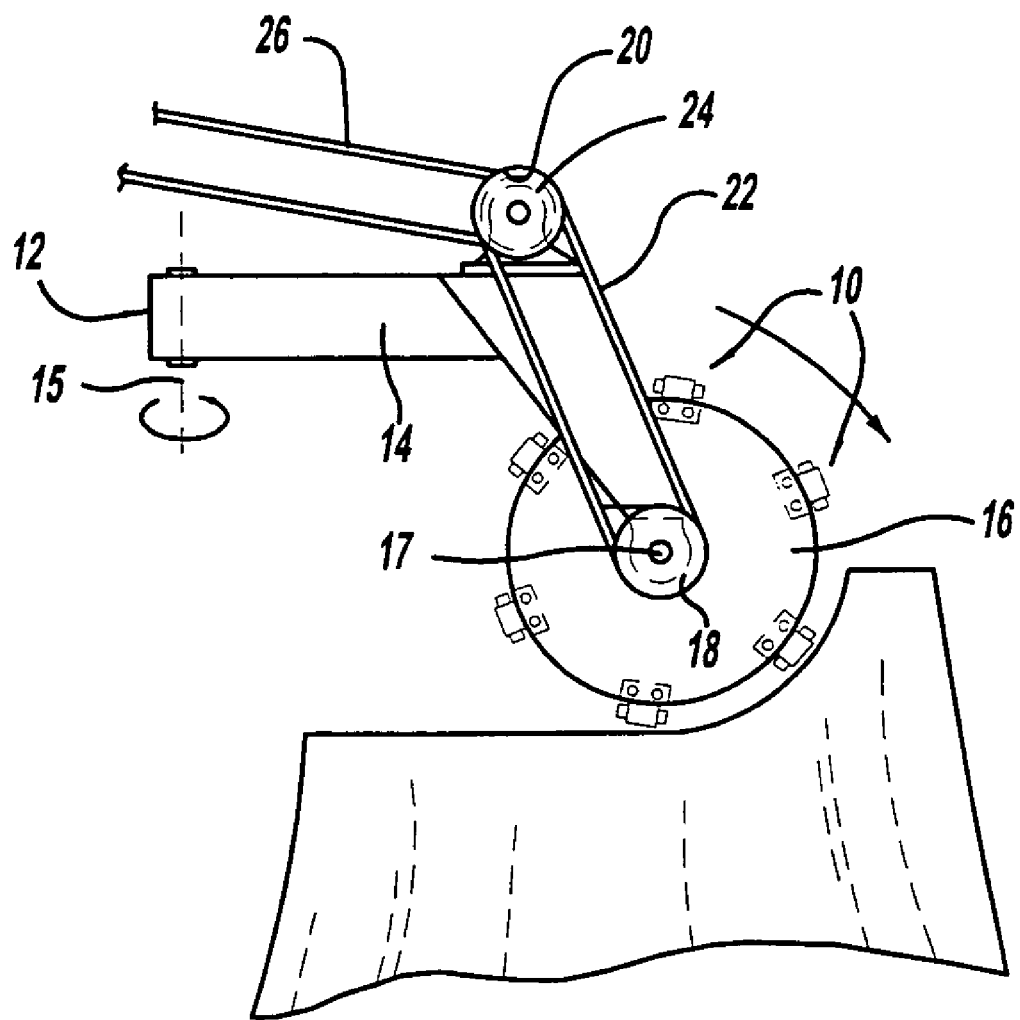
FIG. 1 is a side view of a stump cutting tool assembly, according to the present invention, illustrated in use with a stump cutting apparatus.
Figure 2:
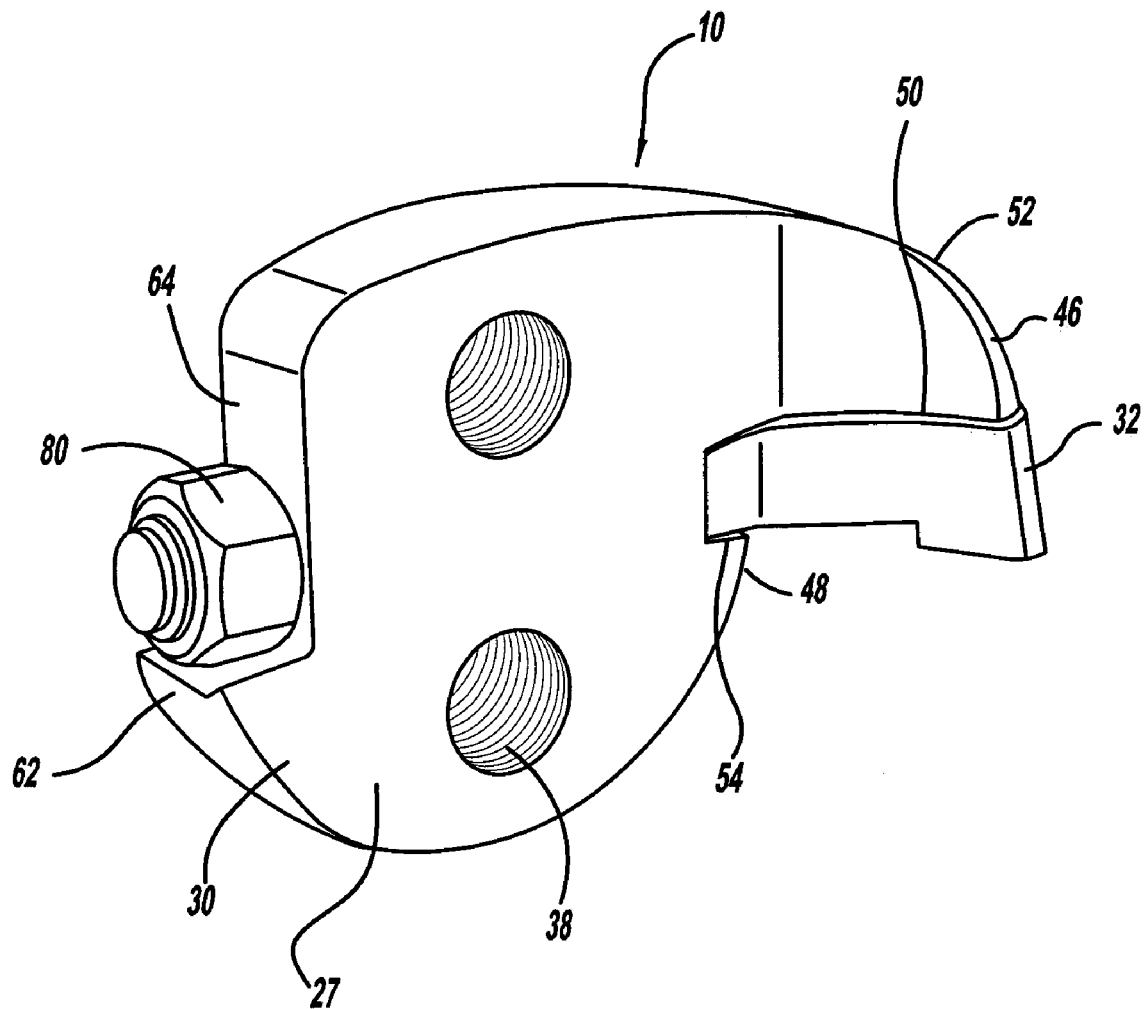
FIG. 2 is a perspective view of a cutting tool according to the present invention.

Referring to FIG. 1, a stump cutting tool assembly 10 according to the present invention is illustrated in operational relationship with a stump cutting apparatus, generally indicated at 12. The stump cutting apparatus 12 includes a wheel frame 14 pivotally supported for pivotal movement about an axis 15 to a remaining portion (not shown) of the stump cutting apparatus 12. The stump cutting apparatus 12 also includes a cutting wheel or drum 16 rotatably mounted at the other end of the wheel frame 14 for rotational movement about an axis 17. The stump cutting apparatus 12 includes a first pulley 18 attached to the cutting wheel 16 and a second pulley 20 attached to the wheel frame 14. The stump cutting apparatus 12 also includes a belt 22 interconnecting the first pulley 18 and second pulley 20. The stump cutting apparatus 12 includes a third pulley 24 connected to the second pulley 20. The stump cutting apparatus 12 further includes a second belt 26 interconnecting the third pulley 24 and a rotational source such as a motor (not shown). The rotational source rotatably moves the second belt 26 to rotate the third pulley 24, in turn, rotating the second pulley 20. Rotation of the second pulley 20 causes the first belt 22 to move, in turn rotating the first pulley 18 and cutting wheel 16. It should be appreciated that the stump cutting apparatus 12 is conventional and known in the art. Also, while shown herein with a cutting disk or wheel 16, the stump cutting tool assembly 10 according to the present invention may be used with a cutting drum.

Referring now to FIGS. 2-5, a stump cutting tool 10 according to the present invention is shown in greater detail. The stump cutting tool 10 includes a pocket or tool holder 30 and a cutting tooth 32. As is known in the art, the pocket or tool holder 30 is typically secured to the cutting wheel 16 in pairs wherein one of the pockets 30 includes a throughbore 34 (see FIG. 6) having an adjacent countersunk portion 36 and an opposite pocket having a threaded bore 38. A threaded fastener 40 (see FIG. 6) extends through the throughbore 34 with the head portion 42 thereof disposed within the countersunk portion 36. The threaded fastener 40 extends through an aperture in the cutting wheel 16 and threadably engages the threaded bore 38 on the opposite or complementary pocket 30. Upon tightening the threaded fastener 40, the respective pockets 30 are drawn together and sandwich the cutting wheel 16 therebetween to secure the pockets 30 to the cutting wheel 16. Although only two bolts or threaded fasteners 40 are used in the present embodiment to secure the pockets 30 to the cutting wheel 16, more can also be used. Such a system or method for attaching the pockets 30 to the cutting wheel 16 is well known in the art.

The pocket 30 further includes a bore 44 forming a socket that receives the cutting tooth 32. The bore 44 extends through the pocket 30 from the distal end 48 to the proximal end 62. Although shown herein with a circular cross-section, the bore 44 may have other cross-sectional shapes such as square, hexagonal, star or eccentric provided the cutting tool has a similar cross-sectional shape. A cutting tooth 32 support portion 46 extends outwardly from the distal end 48 of the pocket 30. The support portion 46 includes a support face 50 and a rear surface or edge 52. The support portion 46 tapers inwardly toward the rear surface or edge 52 to reduce the thickness of the support portion 46 and correspondingly reduce the outer surface area that contacts the stump during cutting. Opposite the support face 50 of the support portion 46 is a leading edge support face 54. The leading edge support face 54 cooperates with the support face 50 of the support portion 46 to form a recess 56 in which the cutting tooth 32 is supported. The recess 56 includes a lower or inner surface 58. The bore 44 extends from the lower or inner surface 58 toward the proximal end 62 of the pocket 30. The lower or inner surface 58 of the recess 56 forms a seat 60 adjacent the bore 44 upon which the cutting tool 32 is seated. The seat 60 operates to properly position and locate the cutting tool 32 within the pocket 30. The bottom or proximal end 62 of the pocket 30 includes a notch 64. The notch 64 provides a detent surface that cooperates with a fastener or other retainer, as set forth more fully below, to secure the cutting tooth 32 in the pocket 30.

The cutting tooth 32 includes a head portion 66 and a shank portion 68. The head portion 66 has a parallelepiped shape formed by a front or leading surface 70 and a rear or trailing surface 72 interconnected by opposite side surfaces 74. A notch or recessed portion 82 is located on the front or leading surface 70 of the head portion 66. A cutting tip 76, typically a hardened insert formed of a material such as tungsten carbide, sits in the notch 82 and is secured to the head portion 66 by brazing. It should be understood that any suitable tough material capable of withstanding abrasion and impact can be substituted for the tungsten carbide and affixed by any method used for the given material such as adhesive, solder or welding.

The shank portion 68 is shown in the preferred embodiment with a cylindrically shaped shaft 84. A plurality of threads 78 are formed on the end 86 of the cylindrically shaped shaft 84 opposite the head portion 66. The interface between the head portion 66 and the shank portion 68 defines a shoulder 88 that sits in the recess 56 and engages the seat 60 formed by the lower or inner surface 58 of the pocket 30. The cutting tooth 32 is held in place on the pocket 30 by a nut 80 engaging the threads 78 of the cylindrically shaped shaft 84. It follows that the support face 50 and leading edge support face 54 of the pocket 30 cooperate with the leading surface 70 and trailing surface 72 of the cutting tool 32 to prevent rotation of the cutting tool 32 during the cutting or stump grinding operation. In addition, positioning the leading surface 70 and trailing surface 72 of the head portion 66 between the support face 50 and leading edge support face 54 of the pocket 30 provides a means to keep the cutting tool 32 from rotating when tightening or loosening the nut 80. The shoulder 88 also functions as a stop to properly position the cutting tip 76 with respect to the pocket 30. Benefits of the cutting tooth 32 and pocket 30 combination according to the present invention is that the combination is self-gauging, offers quick change capability and eliminates wheel where caused by the tooth rocking in the slot. Since the distance between the cutting tip 76 and the shoulder 88 is fixed whenever the cutting tooth 32 is secured within the pocket 30, the cutting tip 76 always extends a fixed distance above the pocket 30.

Although the shank portion 68 is shown herein with a cylindrically shaped shaft 84, the shaft 84 may take or have other cross-sectional shapes. It should be appreciated that the round cross-section of the shaft 84 provides a simple way to manufacture both the cutting tooth 32 and the pocket 30 when compared to various other cross-sections such as hexagonal, square or any other shape or variety. These cross-sectional shapes are, however, suitable alternative designs for the present invention and are therefore encompassed by the present invention. Additionally, the cutting tool 32 is shown held or retained to the pocket 30 with a nut 80 threaded onto the threads 78 of the shaft 84. Other means can also be used to secure the cutting tooth 32 to the pocket 30 including a spring type external or internal lock ring located on the shank portion 68 or bore 44 within the pocket 30 that cooperates with a corresponding groove, a cross pin extending through the pocket 30 and cutting tool 32, and a threaded fastener 40 that is inserted into corresponding internal threads in the shaft member 84.

The support face 50 of the tooth support portion 46 provides added support to the head portion 66 of the cutting tooth 32 during the cutting operation. Further, the support face 50 and leading edge support face 54 cooperate with the head portion 66 of the cutting tooth 32 to prevent rotation of the cutting tooth 32 within the pocket 30 about its longitudinal axis 89 as a result of torosional loads occurring during the cutting operation.

Figure 3:
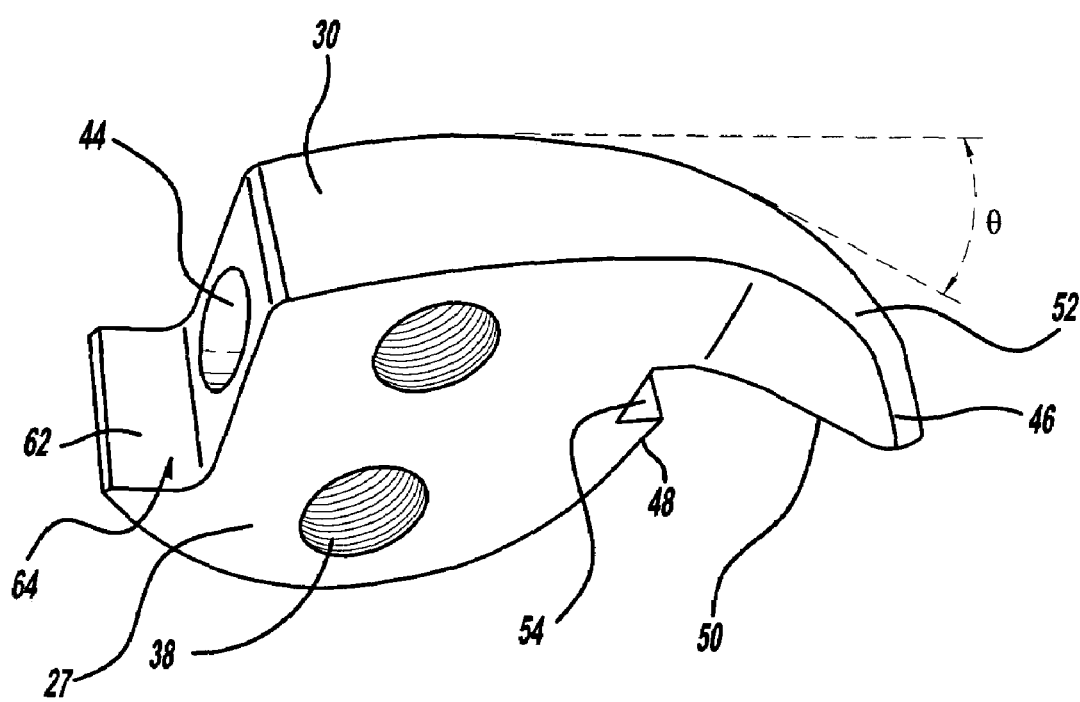
FIG. 3 is a perspective view of a pocket of the cutting tool according to the present invention.
Figure 4:
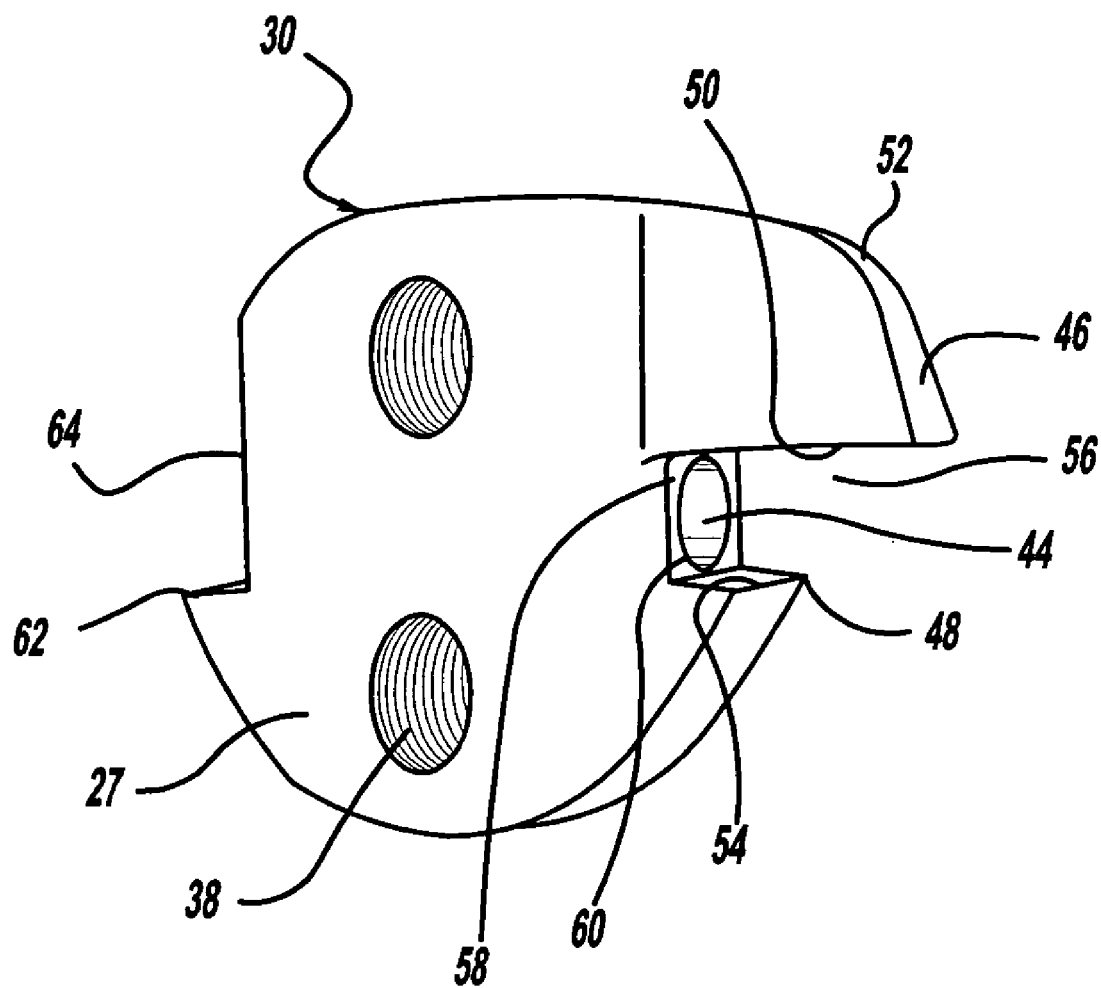
FIG. 4 is an additional perspective view of a pocket of the cutting tool according to the present invention.
Figure 5:
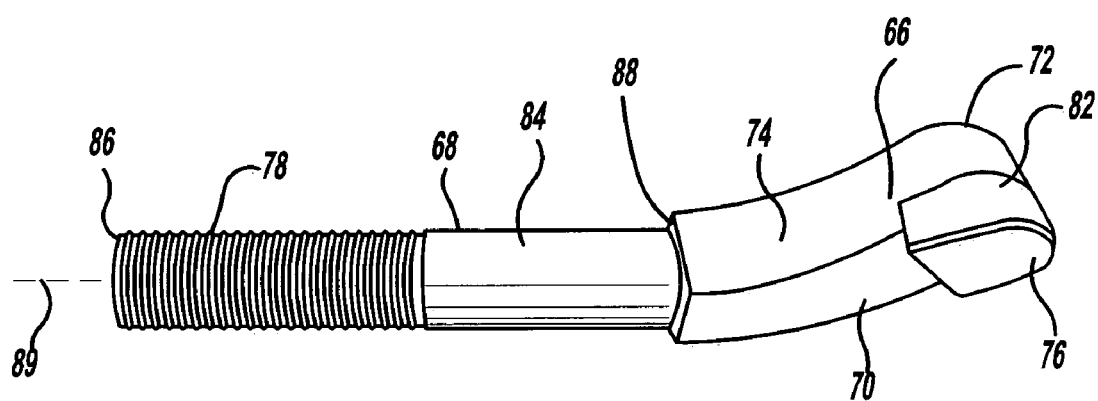
FIG. 5 is a perspective view of a cutting tooth of the cutting tool according to the present invention.

In addition, the pocket 30 and cutting tooth 32 may be manufactured in both a straight and an angled version (see FIG. 3). Angles θ from 0 to 45 degrees are typically employed. The width or thickness of the pocket 30 transitions from the body 27 to the tooth support portion 46 wherein the tooth support portion 46 has a width slightly less than the cutter tip 76 width. This transition is employed to achieve maximum bracing while also providing an adequate clearance angle at the cutting tip 76. Typically this is achieved by a taper as set forth above on the tooth support portion 46 of the pocket 30 near the cutting tip 76 or it can be accomplished by an overall reduction of the width of the tooth support portion 46.

The pocket 30 and cutting tooth 32 may be made of any suitable high strength material and by any process that allows manufacture of such material such as forging, cold forming, hot forming, or casting. Alternate methods of securing or retaining the cutting tool 32 and the pocket 30 include a two-piece, split-bore design as well as a blind-hole bore with the retainer function being served by either a snap ring, set screw or pin. Furthermore, it is possible to omit the bore 44 and use a slot or channel in the pocket 30 to hold the cutting tool 32 without changing the general idea and intended purpose of the present invention which is to capture the cutting tool 32 and hold it in the pocket 30.

Figure 6:
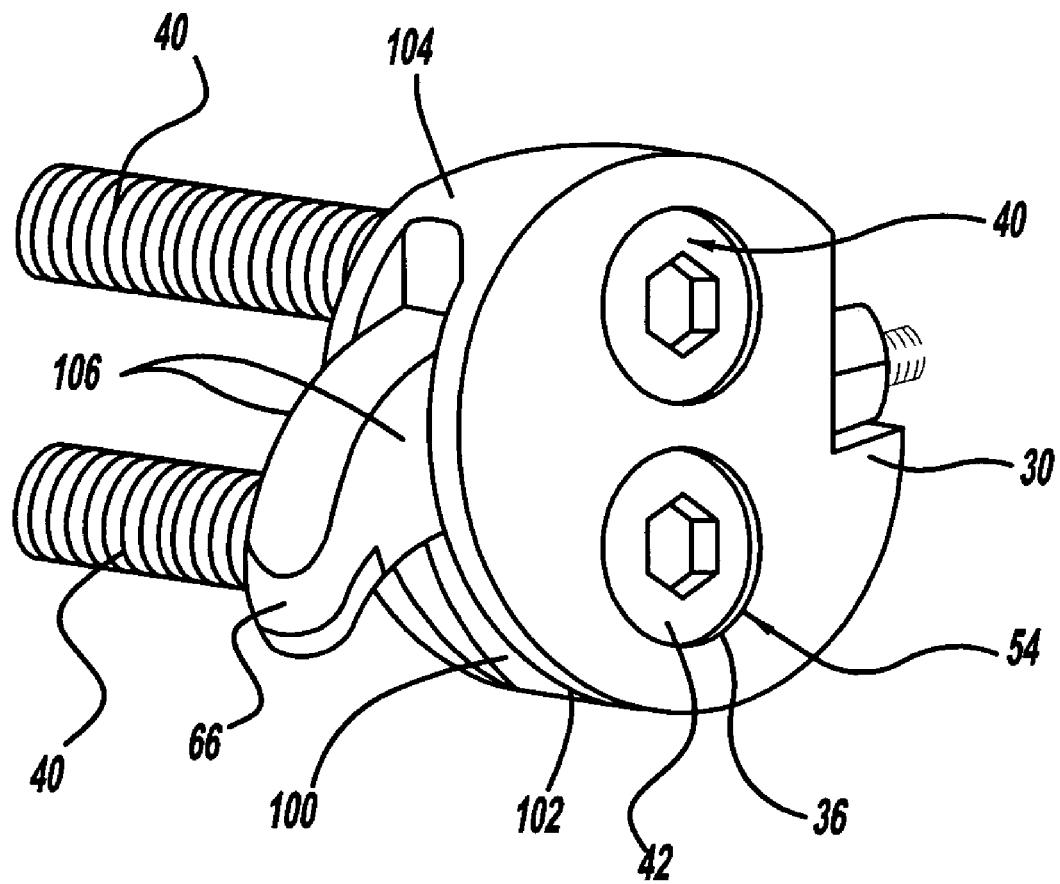
FIG. 6 is a perspective view of an additional embodiment of the cutting tool according to the present invention.
Figure 7:
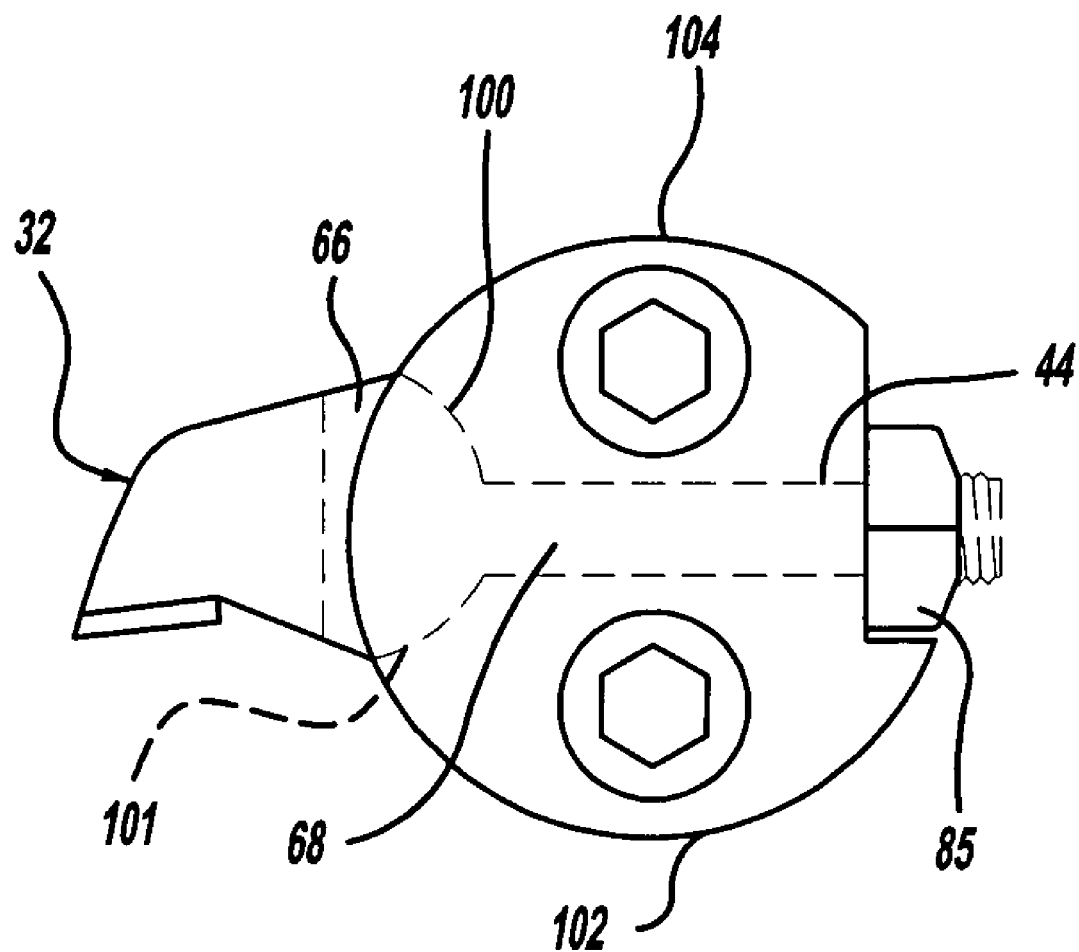
FIG. 7 is a side view of an alternative embodiment of the cutting tool according to the present invention.

Turning now to FIGS. 6-7, there is shown an alternative embodiment of the present invention. As shown therein, the pocket 30 includes a slot 100 extending from the front edge 102 to the rear edge 104 of the pocket 30. The slot 100 is of a width suitable to trap the respective sides 106 of the head portion 66 of the cutting tooth 32 within the slot 100 to support the head portion 66 and prevent rotation during the cutting operation. It should be understood that the slot 100 need not be flat or perpendicular to the bore 44 extending through the pocket 30. The slot 100 may encompass other geometric shapes that allow for the capture, support and seating of the head portion 66 within the pocket 30. See FIG. 7, showing a cutting tooth 32 having a curvelinear lower surface or shoulder 101. In sum, the slot 100 may take any shape that provides lateral and shear load support of the cutting tooth 32. Again, as with the previous embodiment, the shank portion 68 of the cutting tooth 32 is disposed in the bore 44 and extends through the body of the pocket 30. A retainer, such as a nut 80, is used to secure the cutting tooth 32 to the pocket 30. Once again, the head portion 66 of the cutting tooth 32 is larger than the shank portion 68 and correspondingly provides a stop or detent at the interface of the head portion 66 and shank portion 68. It is also within the present invention to use a cutting tooth 32 having a smaller head portion 66 that uses other means such as a pin extending into the shank portion 66 or a protrusion formed as part of the shank portion 66 as a stop or detent to properly position the cutting tooth 32.

Figure 8:
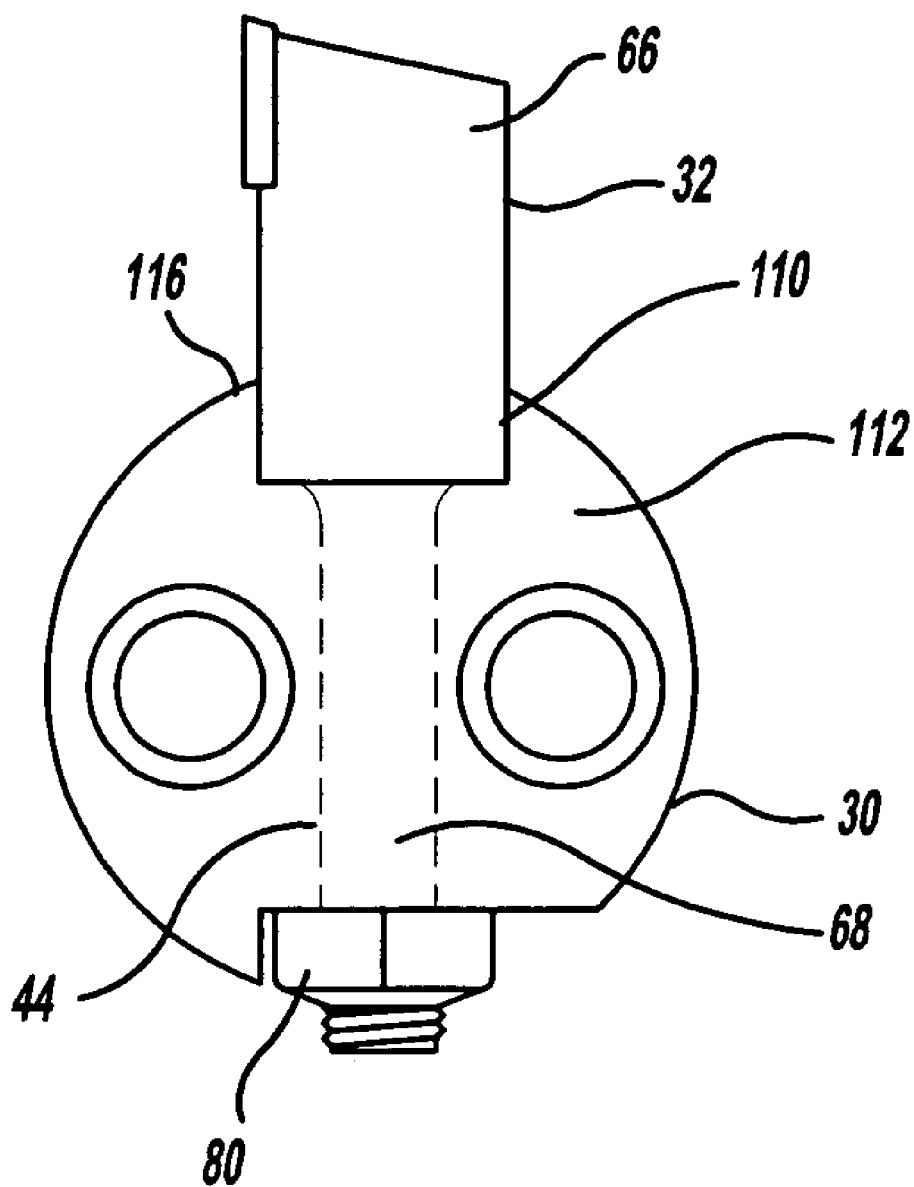
FIG. 8 is a side view of yet another embodiment of a cutting tool according to the present invention.
Figure 9:
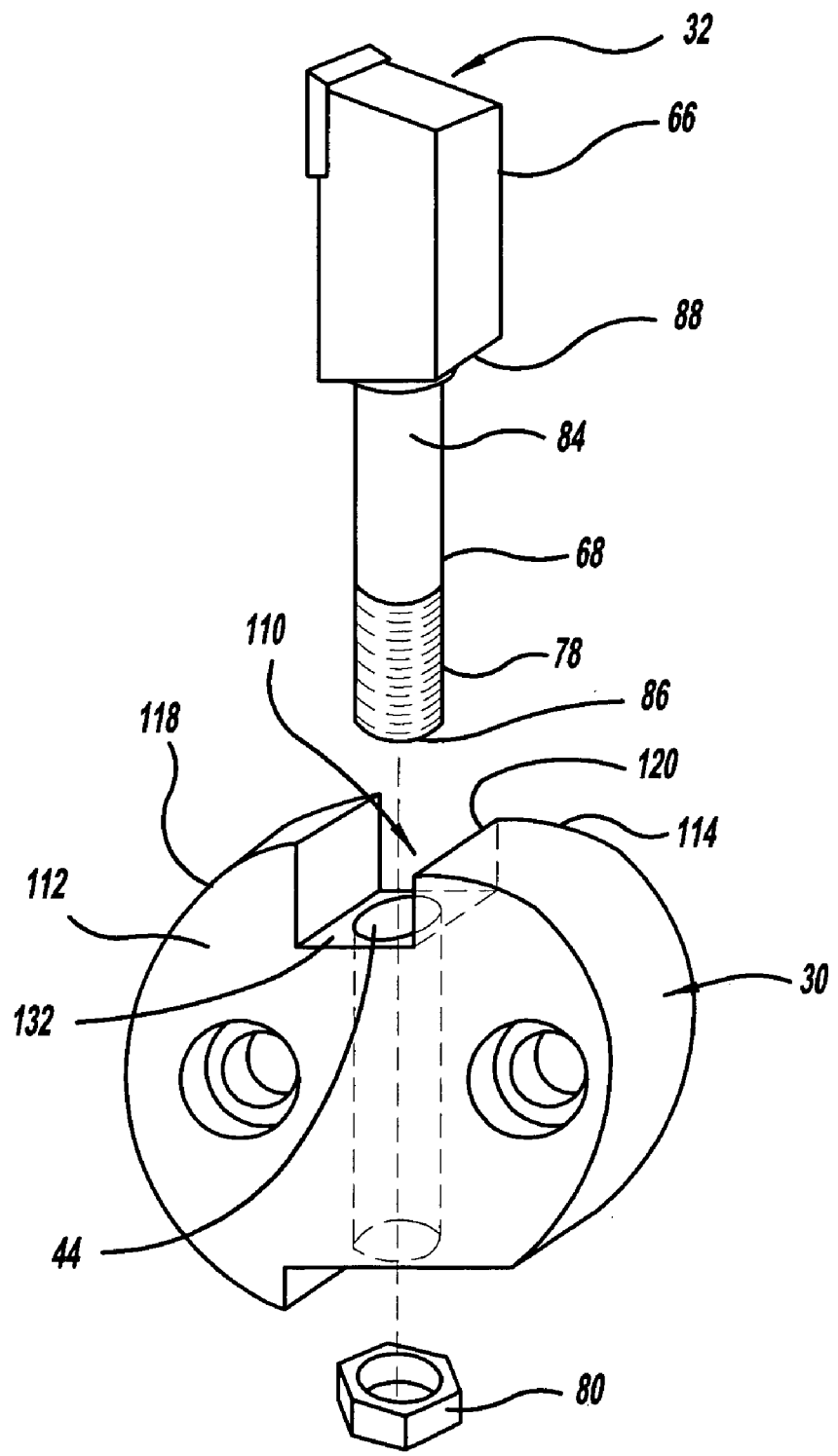
FIG. 9 is an exploded perspective view of the cutting tool assembly of FIG. 8.

FIGS. 8-9 show an additional embodiment of the present invention. Once again, the invention in its base form includes a cutting tooth 32 extending through a bore 44 on a pocket or tool holder 30 wherein the shank portion 68 of the cutting tooth 32 is disposed within the bore 44 and a fastener or nut 80 connects to the shank portion 68 to retain the cutting tooth 32 on the pocket 30. A notch 110 is cut in the upper surface 116 of the circular shaped pocket 30. The notch 110 extends from the outer side surface 112 of the pocket 30 to the inner side surface or mounting face 114 of the pocket 30. The notch 110 forms front 118 and rear 120 support surfaces that engage the head portion 66 of the cutting tooth 32 to provide lateral and shear load support of the cutting tooth 32. As with the previous embodiments, the interface between the shank portion 68 and head portion 66 of the cutting tooth 32 forms the shoulder 88 or stop that engages the lower surface 122 of the notch 110. Again, the shank portion 68 of the cutting tooth 32 includes an elongated, cylindrically shaped shaft 84 having a plurality of threads 78 on one end 86. The shaft 84 passes through the bore 44 and a nut 80 engages the threads 78 to secure the cutting tooth 32 on the pocket 30.

Figure 10:
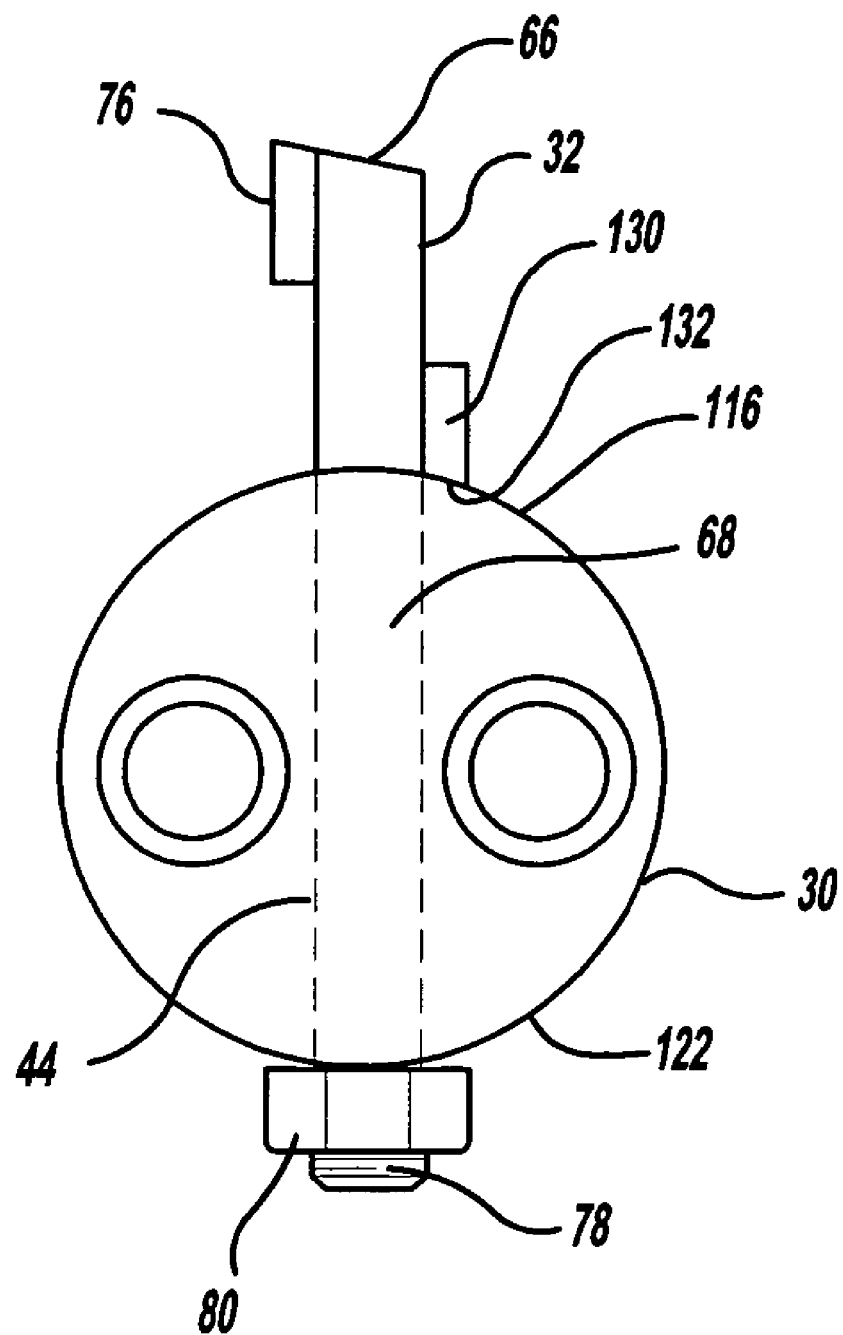
FIG. 10 is a side view of a further embodiment of a cutting tool according to the present invention.

FIG. 10 illustrates a further alternative embodiment of the present invention. As shown therein, the tool holder or pocket 30 has a generally circular shape having a bore 44 extending generally in a direction from the upper surface 116 to the lower surface 122 thereof. The bore 44 has a square cross-section. A cutting tooth 32 having a shank portion 68 with a square cross-section complementary to the cross-section of the bore 44 fits in the 44 bore. It should be understood that it is the complementary cross-sectional shape of the bore 44 and shank portion 68 that prevent rotation of the cutting tooth 32 within the pocket 30. A stop 130 is mounted to the shank portion 68. The stop 130 is attached to the shank portion 68 by brazing, welding or an industrial adhesive. The stop 130 may also be formed as part of the shank portion 68. The stop 130 sits on the upper surface 116 of the pocket 30 to positively locate the cutting tip 76. As with the previous embodiments, a nut 80 engages threads 78 on the shank portion 68 of the cutting tooth 32 to secure the cutting tooth 32 to the pocket 30. Such a device is simplistic in nature. The cutting tool 32 is a square piece of bar stock. A cutting tip 76 is affixed to one end thereof. The opposite end thereof may be threaded or have a slot for a retaining clip. The stop 130 is attached to the shank portion 68 and may have a curved or arcuate surface 132 that engages the upper surface 116 of the circular shaped pocket 30. As with the previous embodiments, the upper and lower surfaces 116,122 may be milled to form a flat surface.

Figure 11:
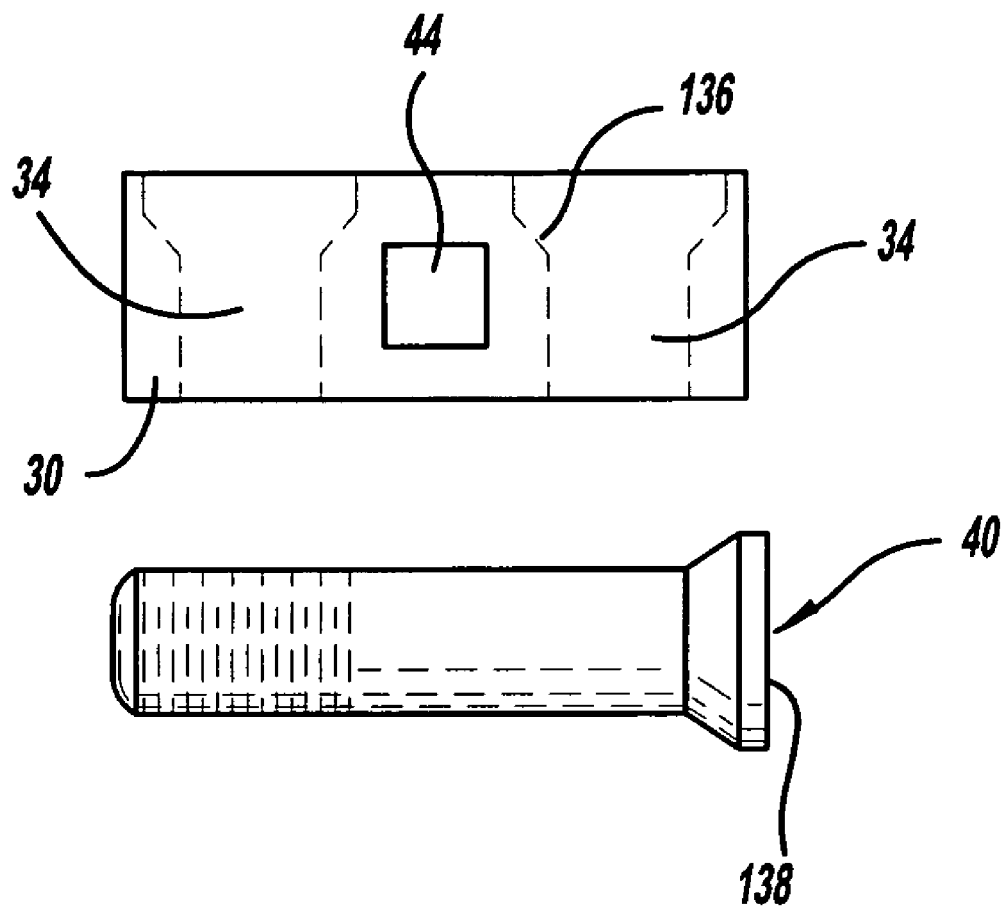
FIG. 11 it is a top view of a pocket and fastener assembly for use with a cutting tool according to the present invention.

Referring to FIG. 11, as the threaded fastener 40 spacing for connecting a pocket 30 to a cutting wheel 16 is standard in the industry, in some instances, a standard socket head screw or threaded fastener used to secure the pocket 30 to the cutting wheel 16 may not be suitable. Accordingly, the invention also includes the use of flat head screws 138 and a shallow countersunk portion 136 to provide additional area for the bore 44.

Figure 12:
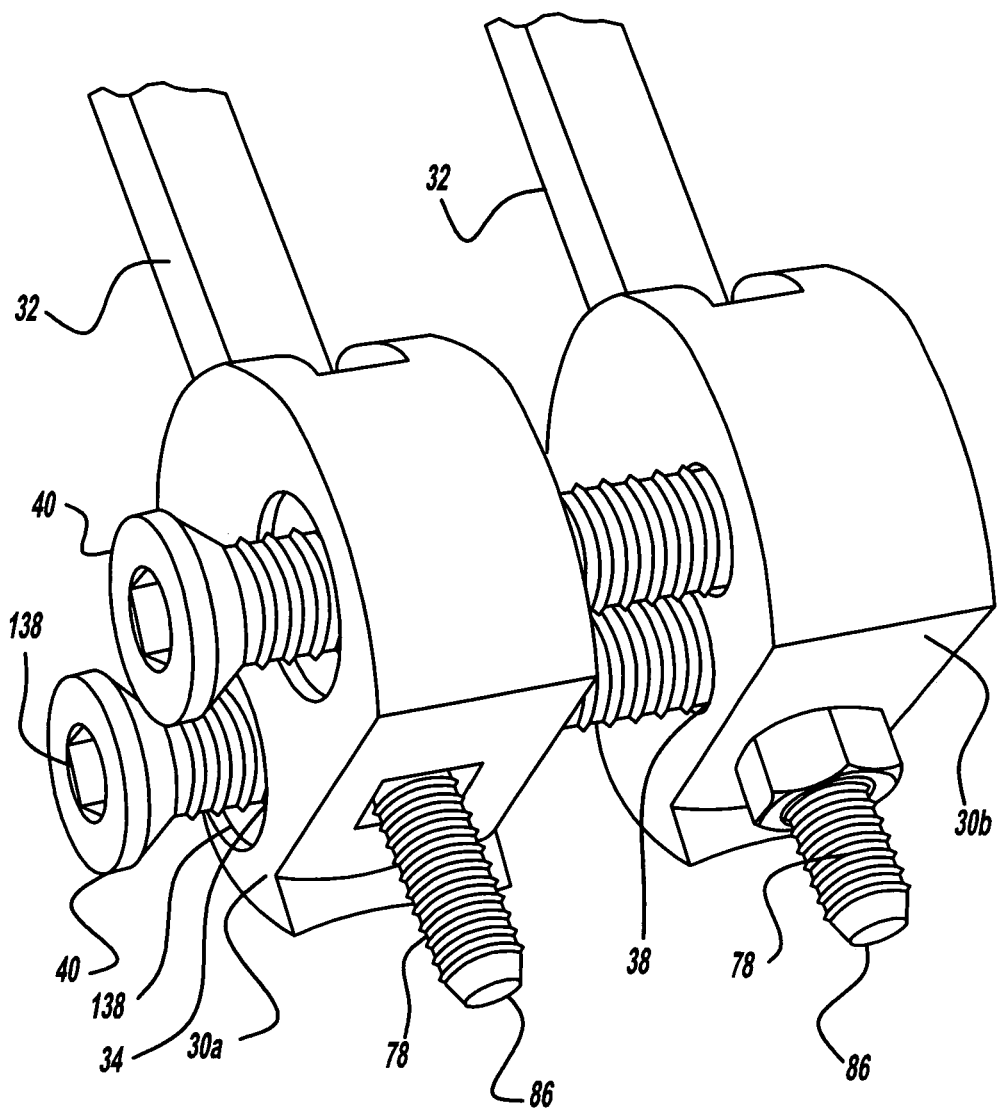
FIG. 12 is a perspective rear view of yet a further embodiment of the cutting tool according to the present invention.
Figure 13:
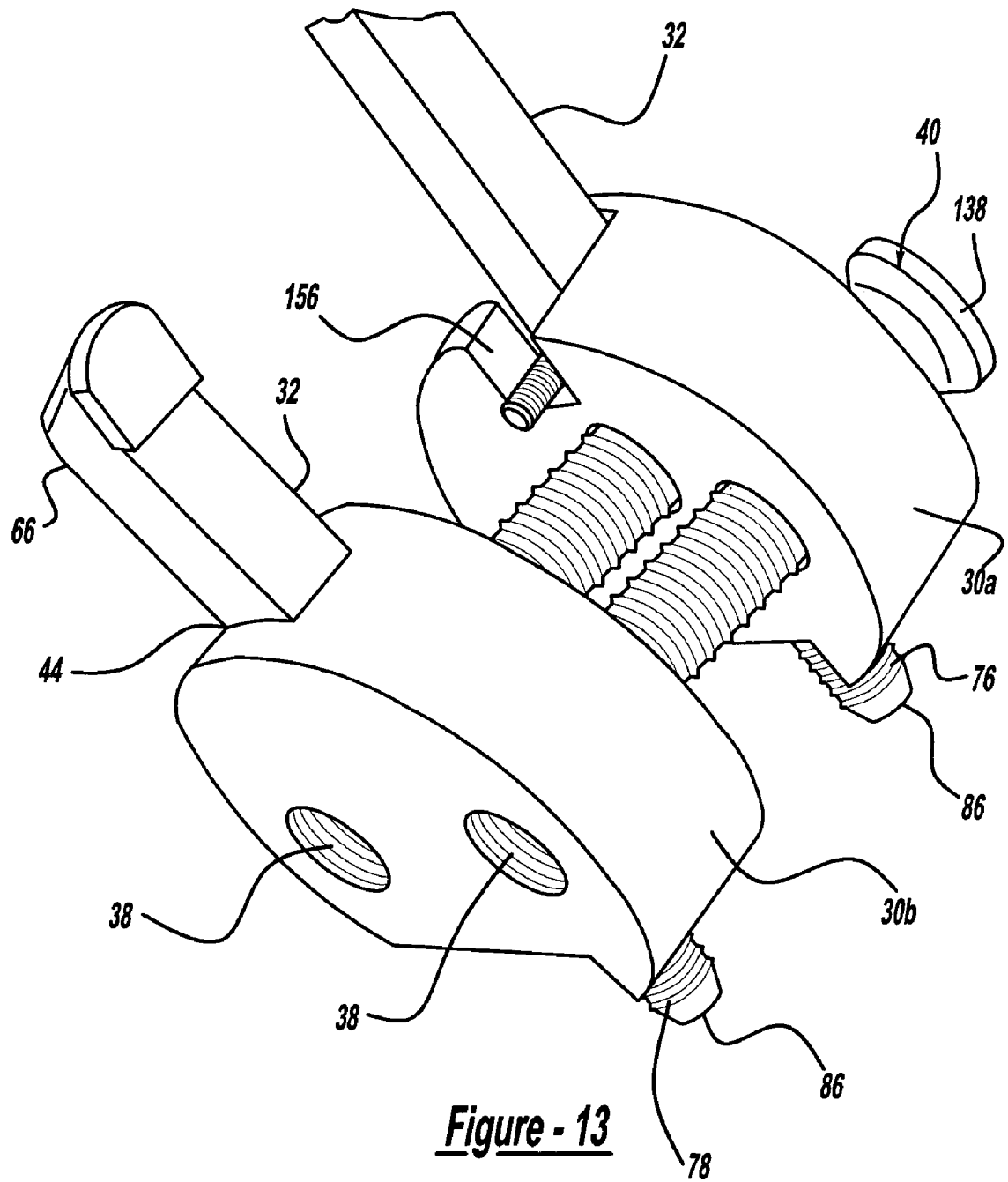
FIG. 13 is a perspective front view of the cutting tool assembly of FIG. 12.
Figure 14:
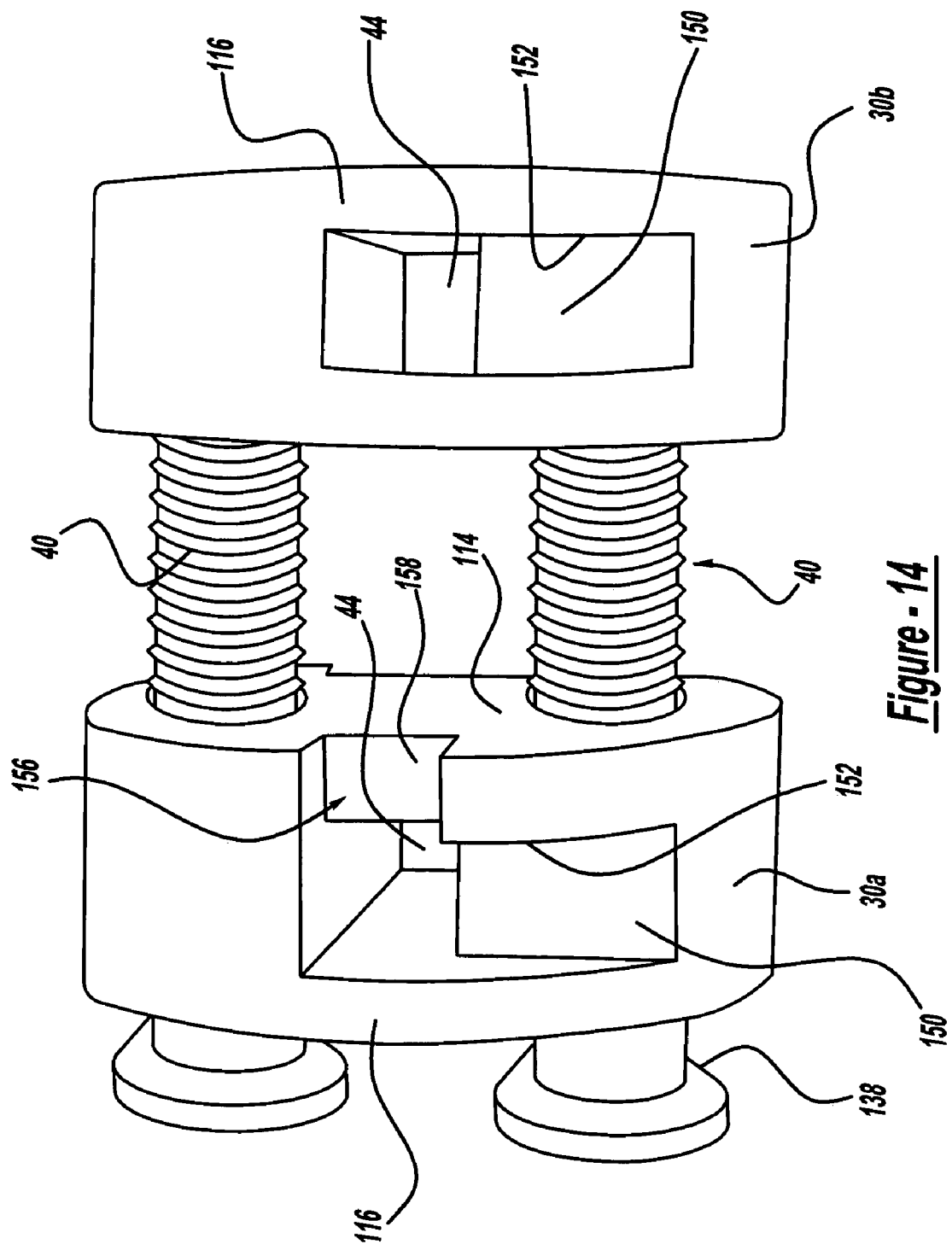
FIG. 14 is a top view of the pockets of the cutting tool assembly of FIG. 12.
Figure 15:
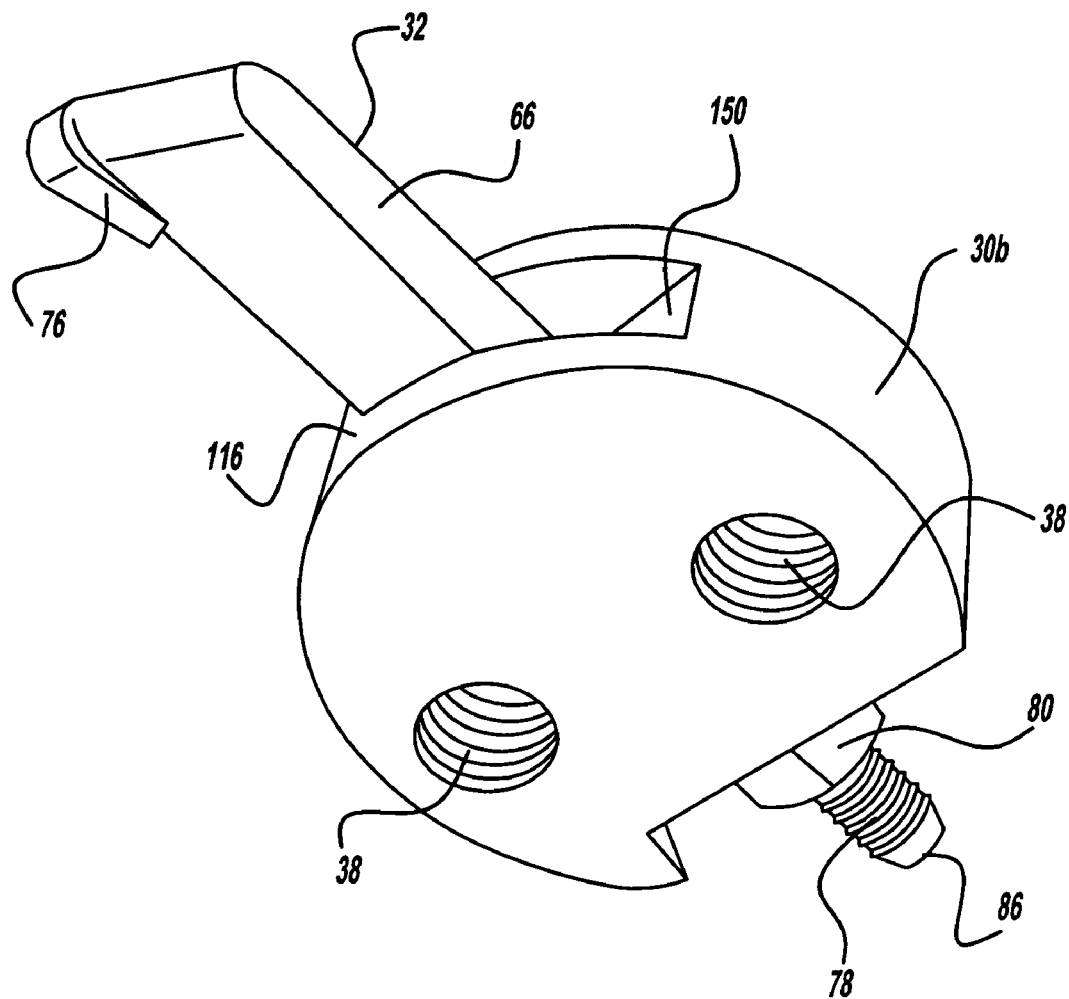
FIG. 15 is a perspective side view of one of the pockets of the cutting tool assembly of FIG. 12.

FIGS. 12-21 disclose a further embodiment of a stump cutting tool assembly 10 according to the present invention. As shown in FIG. 12, the cutting tool according to the present invention includes first and second pockets 30a, 30b. Each of the pockets 30a, 30b having a cutting tooth 32 secured therein. Each of the pockets 30a, 30b are identical except, as set forth previously, a plurality of threaded fasteners 40 extend through a throughbore 34 in the first pocket 30a and are threadably received in the threaded bore 38 in the second pocket 30b. For the purposes of illustration only, the pocket 30a differs from the pocket 30b only to disclose an additional embodiment having a notch 156 for a purpose that is explained below. Again, the threaded fastener 40 is a flat head screw 138 that is seated in a shallow countersunk portion 136 of the first pocket 30a. As shown in FIG. 14, the bore 44 in which the cutting tooth 32 is positioned has a square cross-section and receives a square cross-section shank portion 68 of the cutting tooth 32. Use of the square bore 44 enables the cutting tooth 32 to be made of square bar stock having threads 78 formed on the end 86 opposite the head portion 66 of the cutting tooth 32. Accordingly, the complementary square cross-sections prevent rotation of the cutting tooth 32.

As shown in FIGS. 18 and 18a, the cutting tooth 32 may include an enlarged head portion 66, i.e. larger than the shank portion 68. The enlarged head portion 66 forms a shoulder 88 that rests on the seat 150 formed by a groove 152 milled into the upper surface 116 of the pocket 30. Accordingly, the size of the shoulder 88 is variable depending upon the amount of support needed for the cutting tooth 32 during the cutting operation.

Figure 16:
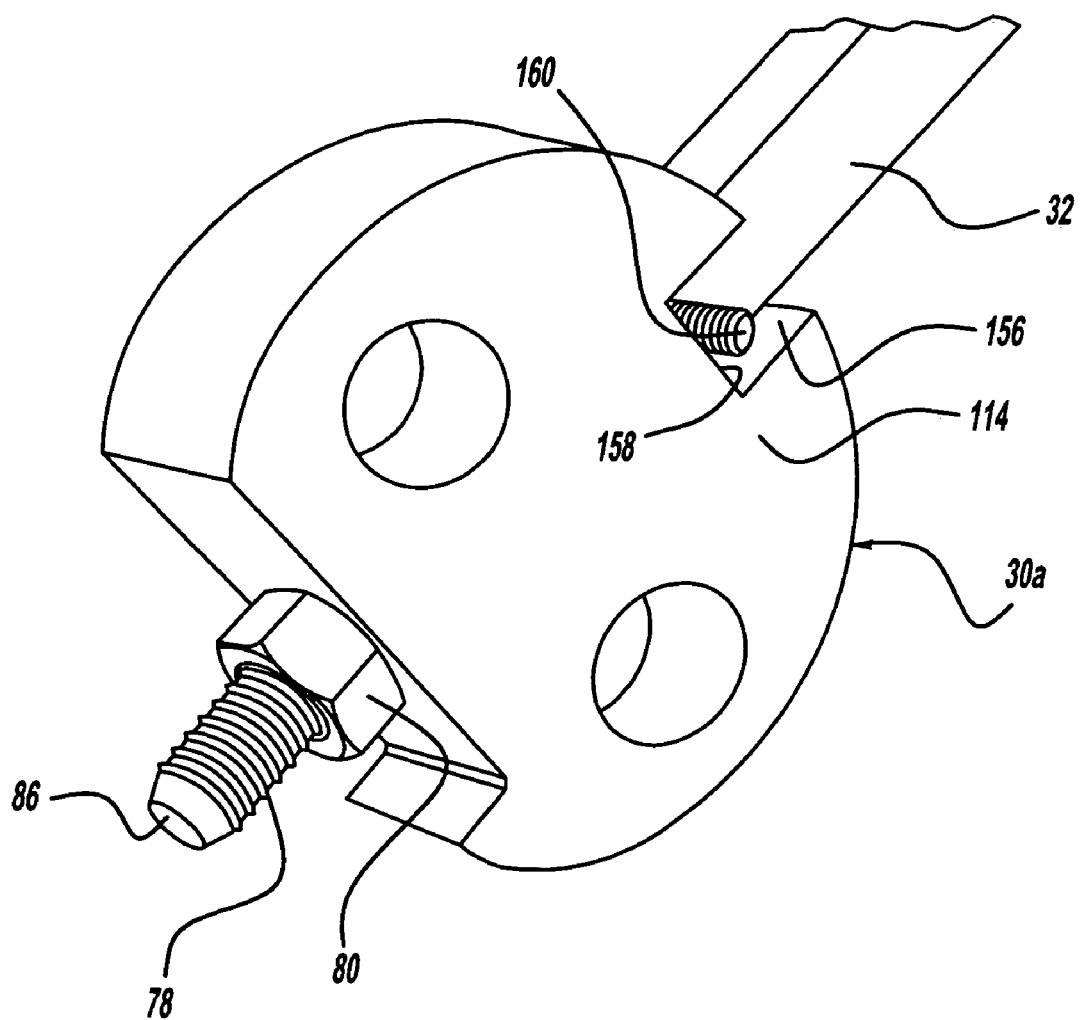
FIG. 16 is a perspective side view of the inner or mounting surface of one of the pockets of the cutting tool assembly of FIG. 12.
Figure 17:
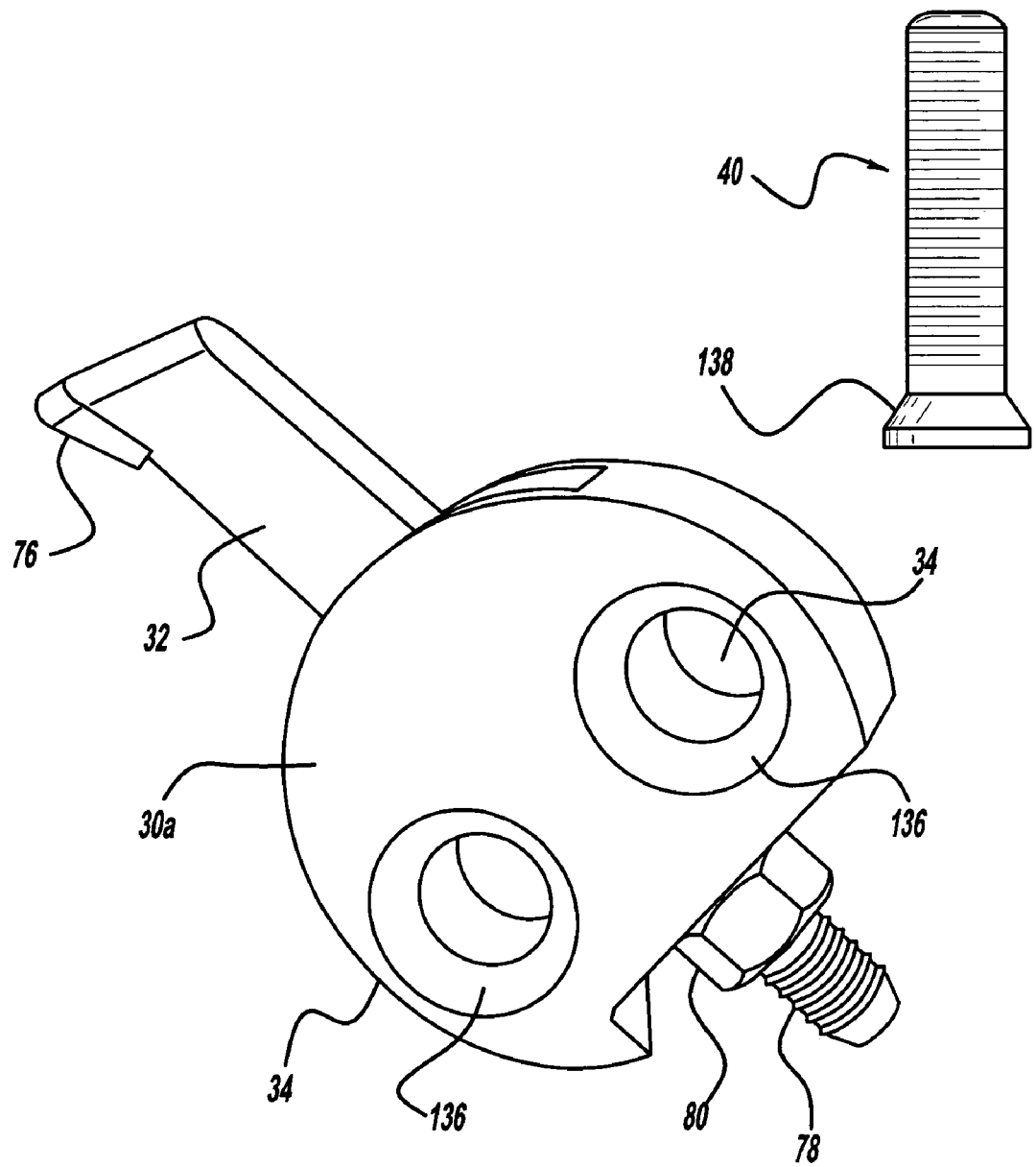
FIG. 17 is a perspective side view of the outer surface of one of the pockets of the cutting tool assembly of FIG. 12.

In some instances, it is desirous to have the cutting tooth 32 bend or deflect when the cutting tooth 32 strikes a hard object such as a rock, to reduce the stress on the stump cutting apparatus 12 and prevent damage to the stump cutting apparatus 12. In such instances, the cutting tooth 32 (see FIGS. 16, 19-21) includes a stop 154 attached thereto. The stop 154 is disposed within a slot or notch 156 located on the interior or mounting face 114 of the pocket 30. The stop 154 rests on a lower or seat surface 158 formed by the notch 156. Accordingly, the cutting tooth 32 and corresponding cutting tip 76 is properly positioned within the pocket 30. Placing the notch 156 on the inner side or mounting face 114 protects the stop 154 and reduces the possibility of abrasion thereof during the cutting operation. The stop is shown in FIGS. 16 and 19 as a screw 160, as shown in FIGS. 20-21, the stop 154 may be formed from a small piece of bar stock that is welded to the side of the cutting tooth 32. Finally, similar to the embodiment shown in FIG. 10, the stop 154 can also face rearward and engage the seat 150.

In addition, the bore 44 in the disclosed embodiments can be a blind bore. Thus, the cutting tooth 32 will not extend all the way through the pocket 30 to the lower surface thereof. In such a case, a pin or snap ring may be used to secure the tooth 32 in the pocket 30. Also, a screw may extend inwardly from inside surface of the pocket 30 and engage the cutting tooth 32.

FIGS. 22-25 disclose a further embodiment of a cutting tooth 200 for use with a stump cutting apparatus 12, see FIG. 1. As shown in FIGS. 22-24, the cutting tooth 200 includes an elongated body 202 having a longitudinal axis 204 and a lateral or transverse axis 205. A head portion 206 is located on a distal end 208 of the elongated body 202. A shank portion 210 is located on a proximal end 212 of the elongated body 202. The head portion 206 has a front or leading surface 214 at one end of the lateral axis 205 and a rear or trailing surface 216 located at the opposite end thereof. The front 214 and rear 216 surfaces are interconnected by opposing side surfaces 218 extending generally in the direction of the lateral axis 205. In the disclosed embodiment, a notch or recess 220 is located on the front or leading surface 214 and receives a cutting tip 222. The cutting tip 222 is secured to the head portion 206 by suitable means such as brazing.

As set forth previously, the cutting wheel or drum 16 rotates about a rotational axis 17. For the purpose of reference, the cutting tooth shown 200 in FIGS. 22-25 is oriented on the cutting wheel or drum 16 such that the longitudinal axis 204 of the cutting tooth 200 extends radially with respect to the rotational axis 17 of the cutting wheel or drum 16. In this position, the head portion 206 located on the distal end 208 is closer to the periphery of the cutting wheel or drum 16 and the shank portion 210 located on the proximal end 212 is closer to the rotational axis 17. Accordingly, the front surface 214 is oriented such that a generally faces in the direction of the lateral axis 205; i.e., typically tangential to a radial extending outwardly from the rotational axis 17 of the cutting wheel or drum 16. It should be understood that the longitudinal axis 204 of the cutting tooth 200 need not lie entirely on a radial; i.e., changes in the position of the longitudinal axis 204 wherein the cutting tooth 200 is secured to the cutting wheel or drum 16 wherein the head portion 206 is located at a greater distance from the rotational axis 17 then the shank portion 210 come within the scope of the invention.

As shown in FIGS. 22-23 the cutting tip 222 is attached to the front surface 214 in a direction substantially parallel to the longitudinal axis 204 and transverse the lateral axis 205. It should be understood that the tip 222 can be attached at an angle skewed to the longitudinal axis 204 in a manner known in the art to provide for chip relief and that such an arrangement is still within the boundaries of the present invention. Accordingly, as is known in the prior art, the cutting tip can be mounted on the front surface 214 at an angle to the front surface 214 or the entire front surface 214 can be angled or skewed with respect to the longitudinal axis 204 of the cutting tooth 200. That is, the front surface 214 may not be generally parallel to the longitudinal axis 204 nor perpendicular to the lateral axis 205.

As shown in FIGS. 22-23, the front surface 214 of the cutting tooth 200 is contiguous with the shank portion 210. The front surface 214 extends inwardly from the distal end 208 toward the proximal end 212 and seamlessly transitions into the shank portion 210. While shown in the drawings as a smooth transition, the present invention is not limited to such an arrangement. As shown in the previous embodiments, the head portion 206 may be attached to the shank portion 210 in many different configurations.

As shown in FIG. 25, the front surface 214 is an arcuate surface, and in the embodiment shown in FIGS. 23-25 is a semi-cylindrical surface. In addition, the rear or trailing surface 216 is an arcuate surface and may be a semi cylindrical surface. It should be understood that both the front or leading surface 214 and the rear or trailing surface 216, are convex surfaces to the extent that they extend outward.

The shank portion 210 includes a retaining assembly 224 located thereon. The retaining assembly 224 includes at least a portion of the shank portion 210 having a cylindrical shape and a plurality of threads 226. Accordingly, a nut, not shown, cooperates with the plurality of threads 226 on the shank portion 210 to retain the cutting tooth 200 on a pocket or mounting block 240 which is typically secured to the cutting wheel 12 as set forth previously. The retaining assembly 224 of the shank portion 210 may also include a slot or groove in the shank portion 210. A clip or retaining ring, not shown, then engages the groove or slot to secure the cutting tooth 200 in place. Further, the retaining assembly 224 could include an aperture, wherein a pin passes through the aperture to hold the cutting tooth 200 in place. In short, various retaining assembly 224 designs can be used on the shank portion 210 of the cutting tooth 200, as long as they secure the cutting tooth 200 in place on the pocket or mounting block 240.

The cutting tooth 200 further includes a shoulder 230 formed by an inclined or sloped surface 232 that extends between the head portion 206 and the shank portion 210. As shown in FIG. 23, the shoulder 230 does not extend all the way to the rear surface 216 of the head portion 206. Correspondingly, a portion of the shoulder 230 extends transversely to the longitudinal axis 204 of the elongated body 202 of the cutting tooth 200 and forms a lip 234. In addition, as shown in FIGS. 22, 24 the inclined surface 232 of the shoulder 230 has an arcuate shape, and may be semi-cylindrical. As with the front and rear surfaces 214, 216, the inclined surface 232 is convex in that it extends outward.

Referring to the head portion 206 of the cutting tooth 200, the upper surface or top 219 of the head portion 206 has a swept back or streamlined configuration which reduces the profile of the cutting tooth 200 from the front surface 214 to the rear surface 216. Such a swept back or streamlined profile reduces the contact area between the head portion 206 and the stump during the cutting operation.

Figure 26:
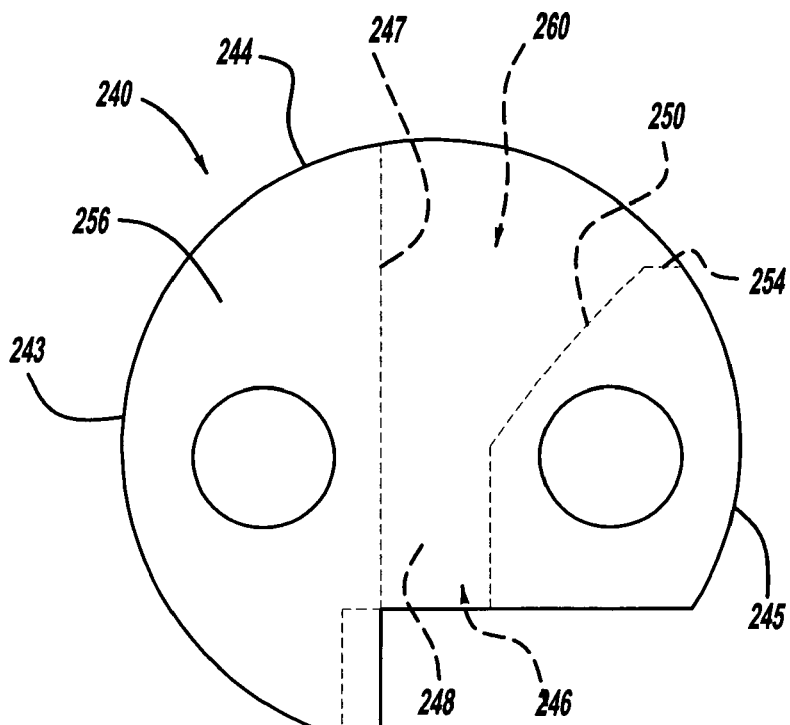
FIG. 26 is a front view of a pocket according to the present invention for use with the cutting tooth of FIG. 22.
Figure 27:
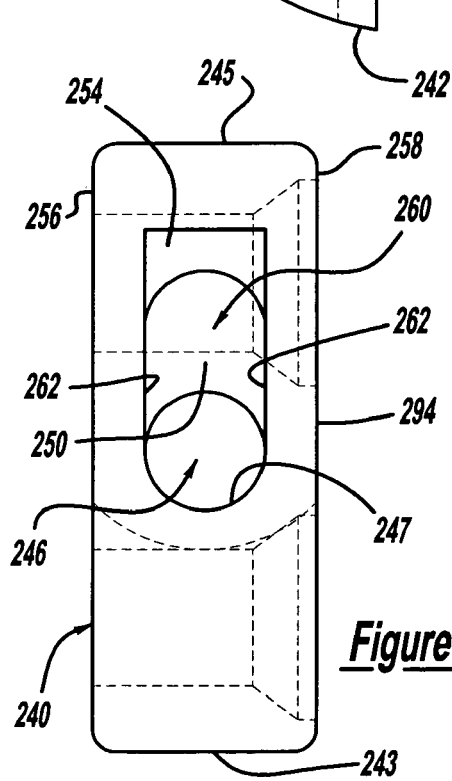
FIG. 27 is a top view of the pocket of FIG. 26.
Figure 28:
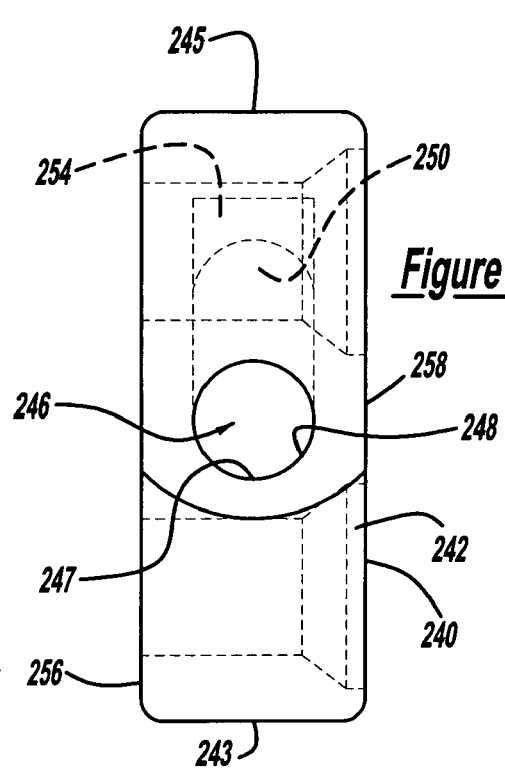
FIG. 28 is a hot and view of the pocket of FIG. 26.

As set forth previously, the cutting tooth 200 is supported on the cutting wheel 12 by a pocket 240, which may otherwise be referred to as a mounting block or tool holder. As shown in FIGS. 26-28, the mounting block 240 has a distal end 242, a proximal end 244, a leading surface 243 and a trailing surface 245. The distal end 242 being the end closer to the periphery of the cutting wheel or drum 16 and the proximal end being the end closer to the axis of rotation 17 of the cutting wheel or drum 16, when the pocket 240 is secured to the cutting wheel or drum 16. Pocket 240 has an inner or mounting face 256 which engages or is placed adjacent the cutting wheel 16 and an outer face 258. An aperture or through bore 246 extends through the pocket or mounting block 240 from the distal end 242 to the proximal end 244. The through bore 246 has a cross-sectional shape corresponding to the cross-sectional shape of a corresponding cutting tool 200. In the embodiment disclosed in FIGS. 23-28, the pocket or mounting block 240 contains a cylindrical bore 248 in the lower portion or proximal end 244 of the pocket or mounting block 240 which corresponds to the cylindrical shape of the shank portion 210 out of the cutting tooth 200. Further, at least a portion of front or leading surface 247 of the through bore 246, that is the surface closest to the leading surface 243 of the pocket 240 is arcuate The pocket or mounting block 240 further includes a notch 260 having side surfaces 262 and a seat surface 250 extending rearwardly from the through bore 246 towards the rear or trailing surface 245 of the mounting block 240. In the embodiment shown in FIGS. 26-28 the seat surface 250 is an inclined, arcuate surface which can be semi-cylindrical. The inclined seat surface 250 is a concave surface in that it extends inward and is complementary to the inclined or sloped arcuate surface 232 of the shoulder 230 of the cutting tooth 200. As shown in FIG. 27, while the notch 260 extends to the rear or trailing surface 245 of the mounting block 240, the inclined seat surface 250 does not. Accordingly, a portion of the notch 260 forms a shelf 254 extending perpendicular to the longitudinal axis of the through bore 246. It should be understood, that the size or length of the notch 260 depends upon the size of the head portion 206 of the cutting tooth 200.

As with the previous embodiments, the cutting tooth 200 is placed in the pocket or mounting block 240 such that the shank portion 210 extends downward through the through bore 246 with part of a shank portion 210, specifically, that part containing the retaining assembly 224, extending below the engagement surface 257 of the cutout area 255 of the proximal end 244 of the pocket or mounting block 240. Accordingly, when inserted in such a manner, the shoulder 230 of the cutting tooth 200 engages the seat surface 250 of the pocket or mounting block 240. Further, in the embodiment shown in FIGS. 23-28, the lip 234 engages the shelf 254. As previously set forth, the arcuate surfaces on both the shoulder 230 and the seat 250 are complementary.

Figure 29:
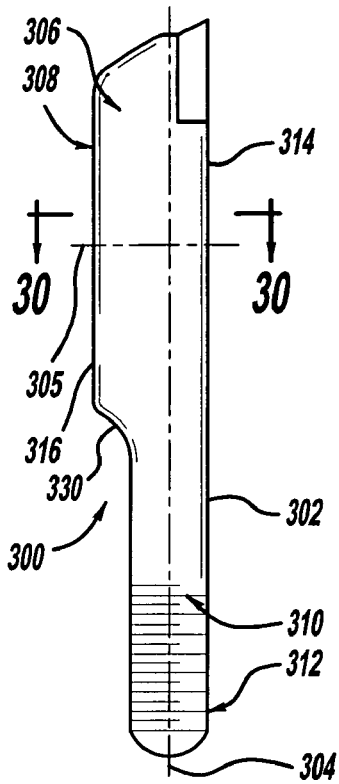
FIG. 29 is a perspective view of the a cutting tooth of yet another embodiment of the present invention.
Figure 30:
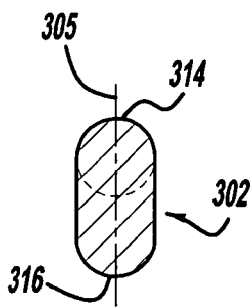
FIG. 30 is a cross-sectional view of the cutting tooth of FIG. 29 taken along lines 30-30.
Figure 31:
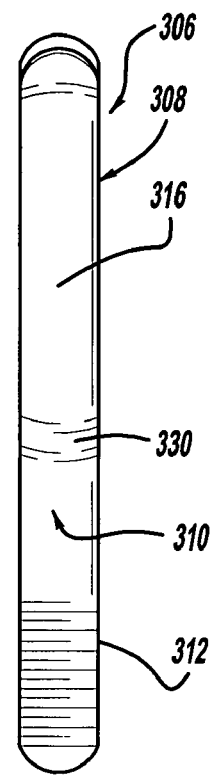
FIG. 31 is a rear view of the cutting tooth of FIG. 29.

Turning now to FIGS. 29-33 there is shown a further embodiment of the cutting tool according to the present invention including a cutting tooth 300 and a pocket or tool holder 340. Once again, the cutting tooth 300 includes an elongated body 302 having a longitudinal axis 304 and a lateral or transverse axis 305. A head portion 306 is located on a distal end 308 of the elongated body 302 and a shank portion 310 is located on a proximal end 312 of the elongated body 302. As shown in FIGS. 29-30, the head portion 306 has a front or leading surface 314 at one end of the lateral axis 305 and a rear or trailing surface 316 is located at the opposite end thereof. In the present embodiment, the front 314 and rear 316 surfaces are generally parallel to one another and the longitudinal axis 304. Similar to the previous embodiment, the front or leading surface 314 and the rear or trailing surface 316 are arcuate surfaces and may be semi-cylindrical.

Figure 32:
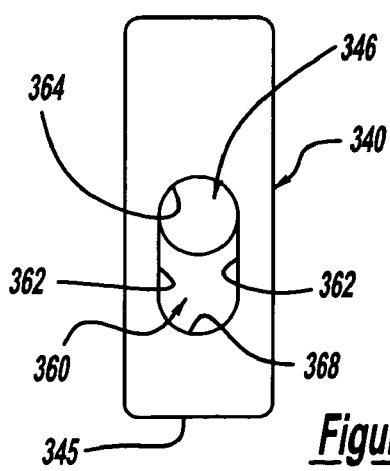
FIG. 32 is a top view of a pocket according to the present invention for use with the cutting tooth of FIG. 29.
Figure 33:
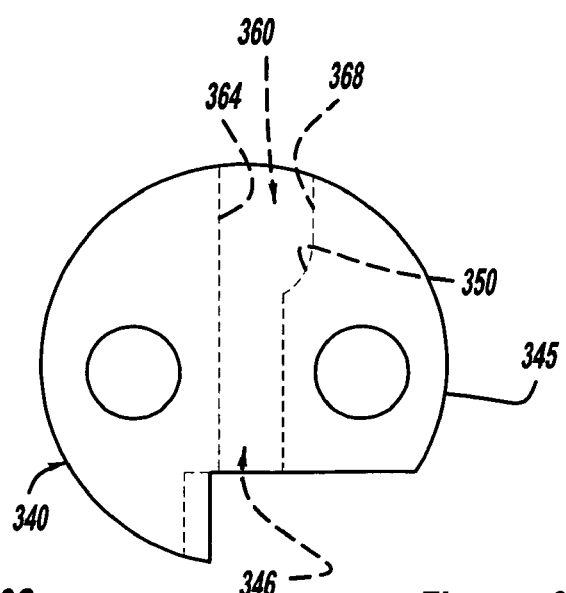
FIG. 33 is a side view of the pocket of FIG. 32.

As shown in FIGS. 32-33, the pocket or mounting block 340 includes a through bore 346 and a notch 360. As shown the notch 360 includes a front or leading surface 364 and a rear or trailing surface 368 interconnected by the respective side surfaces 362. In the present embodiment, the notch 360 does not extend rearwardly to the rear or trailing surface 345 of the pocket or mounting block 340. Thus, the notch forms a socket shaped complementary to the shape of the head portion 306 of the cutting tooth 300. Accordingly, when the cutting tooth 300 is inserted into the pocket or tool holder 340 at least a portion of the head portion 306 of the cutting tooth 300 is supported on all surfaces by the pocket or tool holder 340. As with the previous embodiment, an inclined seat surface 350 cooperates with an inclined shoulder 330 on the cutting tooth 300 to locate and position the cutting tooth 300 within the pocket or mounting block 340.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A cutting tooth for use with a stump cutting apparatus of the type utilizing a cutting wheel or drum rotating about a rotational axis, wherein the cutting tooth is attached to the cutting wheel or drum, the cutting tooth comprising:

an elongated body having a longitudinal axis and a distal end and a proximal end, said longitudinal axis generally extending from said distal end to said proximal end, said proximal end being that end closer to the rotational axis of the cutting wheel when the cutting tooth is attached thereto, said elongated body including a lateral axis and a head portion located on the distal end of said elongated body, said head portion including a front surface, a rear surface disposed laterally behind said front surface, and opposing side surfaces extending laterally from said front surface to said rear surface, a portion of said front surface extending generally parallel to said longitudinal axis;

a cutting tip attached to said front surface;

a shank portion located on the proximal end of said elongated body, said shank portion including a retaining assembly having a recess in the surface of said shank; and a shoulder, said shoulder extending between said head portion and said shank portion, said shoulder including a shoulder surface, said shoulder surface extending rearwardly, with at least a portion thereof having a slope with respect to said longitudinal axis, from said shank portion towards said rear surface of said head portion, said slope greater than zero.

2. A cutting tooth as set forth in claim 1 wherein a portion of said front surface includes an arcuate surface extending between said opposing side surfaces.

3. A cutting tooth as set forth in claim 1 wherein said cutting tip lies in a plane generally parallel with said longitudinal axis.

4. A cutting tooth as set forth in claim 1 wherein said cutting tip lies in a plane skewed with respect to said longitudinal axis.

5. A cutting tooth as set forth in claim 1 wherein said retaining assembly includes a plurality of recesses in the surface of said shank, said recesses forming a plurality of threads located on said shank portion.

6. A cutting tooth as set forth in claim 1 wherein said retaining assembly includes said recess forming a slot located in said shank portion.

7. A cutting tooth as set forth in claim 1 wherein at least a portion of said shoulder surface includes an arcuate surface extending between said opposing side surfaces.

8. A cutting tooth as set forth in claim 1 wherein at least a portion of said rear surface includes an arcuate surface extending between said opposing side surfaces.

9. A cutting tooth as set forth in claim 1 wherein at least a portion of said front surface and of said rear surface includes an arcuate surface extending between said opposing side surfaces.

10. A cutting tooth as set forth in claim 1 wherein said opposing side surfaces are generally parallel.

11. A cutting tooth as set forth in claim 1 wherein said shank is cylindrical and said front surface is cylindrical wherein said shank and said front surface have the same radius of curvature.

12. A cutting tooth for use with a stump cutting apparatus of the type utilizing a cutting wheel or drum rotating about a rotational axis, wherein the cutting tooth is attached to the cutting wheel or drum, the cutting tooth comprising:

an elongated body having a longitudinal axis and a distal end and a proximal end, said proximal end being that end closer to the rotational axis of the cutting wheel when the cutting tooth is attached thereto, said longitudinal axis generally extending from said distal end to said proximal end, said elongated body including a lateral axis;

a head portion located on the distal end of said elongated body, said head portion including an arcuate front surface, a portion of said front surface extending generally parallel to said longitudinal axis, a rear surface disposed laterally behind said front surface, and opposing side surfaces extending laterally from said front surface to said rear surface, said arcuate front surface extending between said opposing side surfaces;

a cutting tip attached to said front surface;

a shank portion located on the proximal end of said elongated body, said shank portion including a plurality of threads; and a shoulder, said shoulder extending rearwardly towards said rear surface on an incline between said shank portion and said head portion, said shoulder including an arcuate shoulder surface extending between opposing side surfaces.

13. A cutting tooth as set forth in claim 12 wherein at least a portion of said front surface of said head portion is coplaner with said shank portion.

14. A cutting tooth as set forth in claim 12 wherein said shank portion has a cylindrical portion and at least a portion of said front surface of said head portion has a radius of curvature similar to that of said cylindrical portion of said shank portion.

15. A cutting tooth as set forth in claim 14 wherein said rear surface of said head portion has a radius of curvature similar to that of said cylindrical portion of said shank portion.

16. A cutting tooth as set forth in claim 12 wherein said cutting tip lies in a plane generally parallel with said longitudinal axis.

\* \* \* \* \*